(12) United States Patent
Aitken et al.

(10) Patent No.: US 11,034,789 B2
(45) Date of Patent: *Jun. 15, 2021

(54) OPHTHALMIC DEVICES CONTAINING LOCALIZED GRAFTED NETWORKS AND PROCESSES FOR THEIR PREPARATION AND USE

(71) Applicant: Johnson & Johnson Vision Care, Inc., Jacksonville, FL (US)

(72) Inventors: Brian Aitken, Edison, NJ (US); Charles W. Scales, St. Augustine, FL (US); Joe M. Wood, Jacksonville, FL (US); Michael F. Widman, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/239,603

(22) Filed: Jan. 4, 2019

(65) Prior Publication Data
US 2019/0233573 A1 Aug. 1, 2019

Related U.S. Application Data

(60) Provisional application No. 62/623,789, filed on Jan. 30, 2018.

(51) Int. Cl.
| | | |
|---|---|---|
| *C08G 18/61* | (2006.01) | |
| *G02B 1/04* | (2006.01) | |
| *C08G 18/04* | (2006.01) | |
| *C08G 18/62* | (2006.01) | |
| *B29D 11/00* | (2006.01) | |
| *C08L 51/08* | (2006.01) | |
| *G02C 7/04* | (2006.01) | |
| *C08F 290/06* | (2006.01) | |

(52) U.S. Cl.
CPC ........ *C08G 18/61* (2013.01); *B29D 11/00067* (2013.01); *B29D 11/00076* (2013.01); *C08F 290/068* (2013.01); *C08G 18/04* (2013.01); *C08G 18/6225* (2013.01); *C08L 51/085* (2013.01); *G02B 1/043* (2013.01); *G02C 7/04* (2013.01); *C08G 2270/00* (2013.01)

(58) Field of Classification Search
CPC .... C08F 265/04; C08F 265/06; C08F 265/00; C08F 2/48; C08F 290/068; B29D 11/00153; B29D 11/00067; B29D 11/00076; C08G 18/61; C08G 18/04; C08G 18/6225; C08G 2270/00; C08L 51/085; G02C 7/04; G02B 1/043
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,808,178 A | 4/1974 | Gaylord |
| 4,018,853 A | 4/1977 | Le Boeuf et al. |
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,190,277 A | 2/1980 | England |
| 4,197,266 A | 4/1980 | Clark et al. |
| 4,680,336 A | 7/1987 | Larsen et al. |
| 4,740,533 A | 4/1988 | Su et al. |
| 4,892,402 A | 1/1990 | Sawamoto et al. |
| 4,910,277 A | 3/1990 | Bambury et al. |
| 5,034,461 A | 7/1991 | Lai et al. |

(Continued)

FOREIGN PATENT DOCUMENTS

| | | |
|---|---|---|
| EP | 0080539 B1 | 6/1983 |
| EP | 0632329 A1 | 1/1995 |

(Continued)

OTHER PUBLICATIONS

Corrales et al, Free radical macrophotoinitiators: an overview on recent advances, Journal of Photochemistry and Photobiology A: Chemistry, vol. 159 (2003), pp. 103-114.
De Groot et al, Hydrophilic Polymeric Acylphospine Oxide Photoinitiators/Crosslinkers for in Vivo Blue-Light Photopolymerization, Biomacromolecules, 2001, vol. 2, pp. 1271-1278.
Engel et al, An Aliphatic Bifunctional Free Radical Initiator. Synthese of a Block Copolymer froman Azoperester by Sequential Thermal and Photochemical Initiation, Macromolecules 2003, vol. 36, pp. 3821-3825.
Gunersel et al, Bisacylphosphine Oxides as bifunctional Photoinitiators for block copolymer synthesis, Die Angewandte Makromolekulare Chemie, vol. 264 Nr. 4604, (1999), pp. 88-91.

(Continued)

*Primary Examiner* — Robert C Boyle
(74) *Attorney, Agent, or Firm* — Raef M. Shaltout

(57) ABSTRACT

Provided are polymer compositions made by a process comprising: (a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker; (b) subjecting the first reactive composition to a first activation step such that the first reactive composition polymerizes therein to form a crosslinked substrate network containing a covalently bound activatable free radical initiator; (c) contacting the crosslinked substrate network with a grafting composition containing one or more ethylenically unsaturated compounds, wherein the contacting is conducted under conditions such that the grafting composition penetrates into the crosslinked substrate network; and (d) activating the covalently bound activatable free radical initiator at one or more selective regions of the crosslinked substrate network such that the grafting composition polymerizes with the crosslinked substrate network at the selective regions.

18 Claims, 3 Drawing Sheets

(56) References Cited

U.S. PATENT DOCUMENTS

| | | |
|---|---|---|
| 5,039,459 A | 8/1991 | Kindt-Larsen et al. |
| 5,070,215 A | 12/1991 | Bambury et al. |
| 5,244,981 A | 9/1993 | Seidner et al. |
| 5,258,024 A | 11/1993 | Chavel et al. |
| 5,310,779 A | 5/1994 | Lai |
| 5,314,960 A | 5/1994 | Spinelli et al. |
| 5,321,108 A | 6/1994 | Kunzler et al. |
| 5,331,067 A | 7/1994 | Seidner et al. |
| 5,371,147 A | 12/1994 | Spinelli et al. |
| 5,387,662 A | 2/1995 | Kunzler et al. |
| 5,539,016 A | 7/1996 | Kunzler et al. |
| 5,726,733 A | 3/1998 | Lai et al. |
| 5,760,100 A | 6/1998 | Nicolson et al. |
| 5,849,811 A | 12/1998 | Nicolson et al. |
| 5,944,853 A | 8/1999 | Molock et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,367,929 B1 | 4/2002 | Maiden et al. |
| 6,372,815 B1 | 4/2002 | Sulc et al. |
| 6,586,038 B1 | 7/2003 | Chabrecek et al. |
| 6,617,373 B2 | 9/2003 | Sulc et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 6,951,894 B1 | 10/2005 | Nicolson et al. |
| 6,992,118 B2 | 1/2006 | Sulc et al. |
| 7,052,131 B2 | 5/2006 | McCabe et al. |
| 7,247,692 B2 | 7/2007 | Laredo |
| 7,262,232 B2 | 8/2007 | Sulc et al. |
| 7,396,890 B2 | 7/2008 | Zanini et al. |
| 7,461,937 B2 | 12/2008 | STeffen et al. |
| 7,468,398 B2 | 12/2008 | Nicolson et al. |
| 7,538,146 B2 | 5/2009 | Nicolson et al. |
| 7,553,880 B2 | 6/2009 | Nicolson et al. |
| 7,572,841 B2 | 8/2009 | Chen et al. |
| 7,649,027 B2 | 1/2010 | Imai |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,825,170 B2 | 11/2010 | Steffen et al. |
| 7,905,594 B2 | 3/2011 | Widman et al. |
| 7,915,323 B2 | 3/2011 | Awasthi et al. |
| 7,994,356 B2 | 8/2011 | Awasthi et al. |
| 8,022,158 B2 | 9/2011 | Rathore et al. |
| 8,157,373 B2 | 4/2012 | Widman et al. |
| 8,163,206 B2 | 4/2012 | Chang et al. |
| 8,240,849 B2 | 8/2012 | Widman et al. |
| 8,273,802 B2 | 9/2012 | Laredo et al. |
| 8,313,828 B2 | 11/2012 | Widman et al. |
| 8,317,505 B2 | 11/2012 | Widman et al. |
| 8,318,055 B2 | 11/2012 | Widman et al. |
| 8,399,538 B2 | 3/2013 | Steffen et al. |
| 8,415,404 B2 | 4/2013 | Nicolson et al. |
| 8,415,405 B2 | 4/2013 | Maggio et al. |
| 8,420,711 B2 | 4/2013 | Awasthi et al. |
| 8,450,387 B2 | 5/2013 | McCabe et al. |
| 8,487,058 B2 | 7/2013 | Liu et al. |
| 8,568,626 B2 | 10/2013 | Nicolson et al. |
| 8,795,558 B2 | 8/2014 | Widman et al. |
| 8,883,872 B2 | 11/2014 | Gruützmacher et al. |
| 8,937,110 B2 | 1/2015 | Alli et al. |
| 8,937,111 B2 | 1/2015 | Alli et al. |
| 8,940,812 B2 | 1/2015 | Reboul et al. |
| 8,980,972 B2 | 3/2015 | Driver |
| 9,056,878 B2 | 6/2015 | Fujisawa et al. |
| 9,075,186 B2 | 7/2015 | Widman et al. |
| 9,120,900 B2 | 9/2015 | Grutzmacher et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,180,633 B2 | 11/2015 | Widman et al. |
| 9,180,634 B2 | 11/2015 | Widman et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 9,417,464 B2 | 8/2016 | Wildsmith et al. |
| 9,610,742 B2 | 4/2017 | Widman et al. |
| 9,857,607 B2 | 1/2018 | Widman et al. |
| 9,927,633 B2 | 3/2018 | Franklin et al. |
| 2002/0016383 A1 | 2/2002 | Iwata et al. |
| 2003/0162862 A1 | 8/2003 | McCabe et al. |
| 2006/0142410 A1* | 6/2006 | Baba ............... C08F 290/068 523/106 |
| 2010/0120939 A1 | 5/2010 | Phelan |
| 2012/0142805 A1 | 6/2012 | Grutzmacher et al. |
| 2013/0168617 A1 | 7/2013 | Alli et al. |
| 2013/0172440 A1 | 7/2013 | Alli et al. |
| 2013/0176529 A1 | 7/2013 | Li et al. |
| 2013/0217620 A1 | 8/2013 | Alli et al. |
| 2014/0024791 A1 | 1/2014 | Aili et al. |
| 2014/0031447 A1 | 1/2014 | Aiii et al. |
| 2015/0094395 A1 | 4/2015 | Alli et al. |
| 2015/0146159 A1 | 5/2015 | Archer et al. |

FOREIGN PATENT DOCUMENTS

| | | |
|---|---|---|
| EP | 1286823 B1 | 6/2009 |
| RU | 1500316 A1 | 8/1989 |
| RU | 1789208 A1 | 1/1993 |
| WO | 96/31792 A1 | 10/1996 |
| WO | 1999029750 A1 | 6/1999 |
| WO | 2000002937 A1 | 1/2000 |
| WO | 2001030512 A2 | 5/2001 |
| WO | 2001078971 A1 | 10/2001 |
| WO | 2003/022321 A2 | 3/2003 |
| WO | 2003/022322 A2 | 3/2003 |
| WO | 2004063795 A1 | 7/2004 |
| WO | 2008003601 A1 | 1/2008 |
| WO | 2009026659 A1 | 3/2009 |
| WO | 2010121387 A1 | 10/2010 |
| WO | 2015038577 A1 | 3/2015 |
| WO | 2018026822 A1 | 2/2018 |

OTHER PUBLICATIONS

International Search Report, dated Oct. 30, 2017, for PCT Int'l Appln. No. PCT/US2017/044912.

ISO 18369-4:2006: Ophthalmic optics—Contact lenses—Part 4: Physicochemical properties of contact lens materials.

ISO 9913-1: 1996: Optics and optical instruments—Contact Lenses—Part 1: Determination of oxygen permeability and transmissibility by the FATT method.

Jockusch et al, A Steady-State and Picosecond Pump-Probe Investigation of the Photophysics of an Acyl and a Bis (acyl)phosphine Oxide, J. Am. Chem. Soc., vol. 119, No. 47, 1997, pp. 11495-11501.

Jockusch et al, Phosphinoyl Radicals: Structure and Reactivity. A Laser Flash Photolysis and Time-Resolved ESR Investigation, J. Am. Chem. Soc., vol. 120, No. 45, 1998, pp. 11773-11777.

Sitzmann, Critical photoinitiators for UV-LED Curing: Enabling 3D Printing, Inks and Coatings, BASF, Redondo Beach, CA, Mar. 10, 2015.

Waters et al, Structure and Mechanism of Strength Enhancement in Interpenetrating Polymer Network Hydrogels, Macromolecules 2011, vol. 44, pp. 5776-5787.

International Preliminary Report on Patentability, dated Aug. 4, 2020, for PCT Int'l Appln. No. PCT/IB2019/050427.

International Preliminary Report on Patentability, dated Aug. 4, 2020, for PCT Int'l Appln. No. PCT/IB2019/050428.

International Preliminary Report on Patentability, dated Feb. 5, 2019, for PCT Int'l Appln. No. PCT/US2017/044912.

International Search Report, dated Jul. 17, 2019, for PCT Int'l Appln. No. PCT/IB2019/050427.

International Search Report, dated Jul. 17, 2019, for PCT Int'l Appln. No. PCT/IB2019/050428.

(56) References Cited

OTHER PUBLICATIONS

Kolczak, et al, "Reaction Mechanism of Moacyl- and Bisacylphosphine Oxide Photoinitiators Studied by 31P-, 13C-, and 1H-CIDNP and ESR" in J. Am. Chem. Soc., 1996, 118, pp. 6477-6489.

* cited by examiner

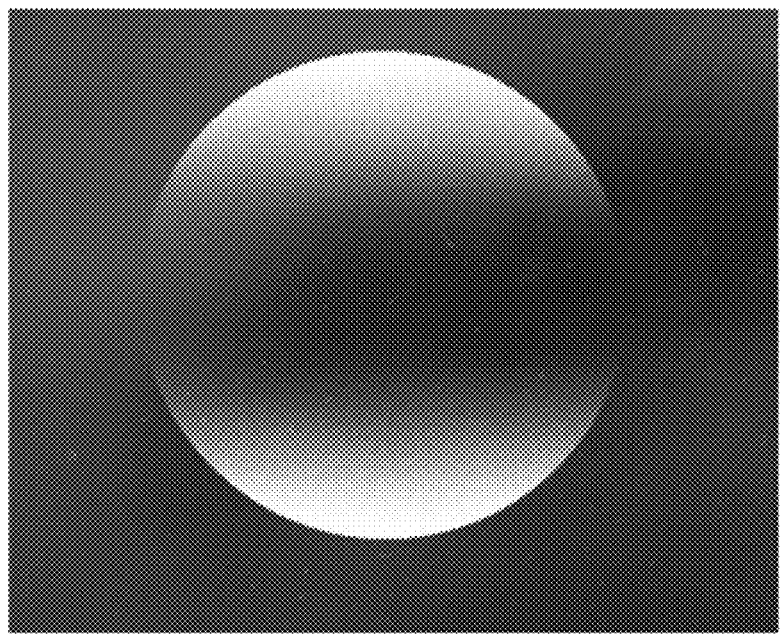
Fig. 2. Minus10 Cylinder DMD Light Show Thickness Profile
(Black = thick; White= thin; Grey=intermediate)

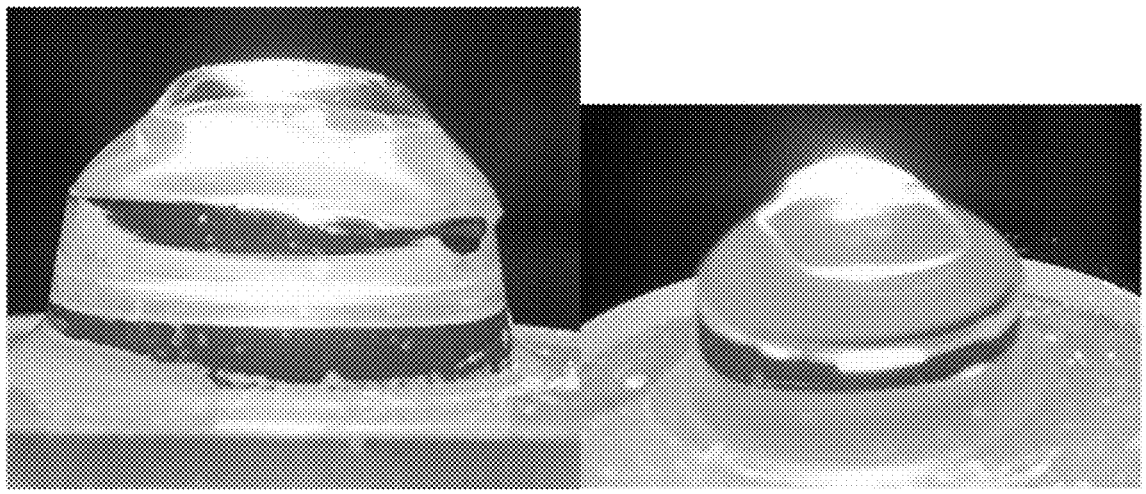
Grafted Lenses with added cylinder
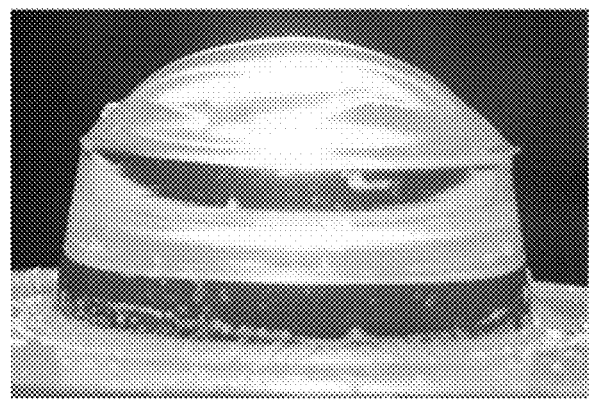
Un-Grafted Spherical Lens
Fig. 3. Pictures of Sterilized Grafted and Un-Grafted Lenses

US 11,034,789 B2

OPHTHALMIC DEVICES CONTAINING LOCALIZED GRAFTED NETWORKS AND PROCESSES FOR THEIR PREPARATION AND USE

RELATED APPLICATIONS

This application claims priority to U.S. Provisional Patent Application No. 62/623,789, filed Jan. 30, 2018, which is incorporated herein by reference in its entirety.

FIELD OF THE INVENTION

The invention relates to ophthalmic devices, such as contact lenses, that contain grafted polymeric networks and processes for preparing and using the ophthalmic devices.

BACKGROUND OF THE INVENTION

The development of polymer materials prepared from individual components that contribute desirable properties is an ongoing goal in many product areas. For instance, polymer materials displaying oxygen permeability and hydrophilicity are desirable for a number of applications within the medical devices field, such as in ophthalmic devices.

A commonly encountered challenge when forming polymeric materials that attempt to combine properties is that in many cases, the individual components from which the final material is made are not readily compatible with each other. For instance, in the contact lens field, silicone hydrogels have been found to provide lenses with significantly increased oxygen permeability and therefore are capable of reducing corneal edema and hyper-vasculature, conditions that may sometimes be associated with conventional hydrogel lenses. Silicone hydrogels have typically been prepared by polymerizing mixtures containing at least one silicone-containing monomer or reactive macromer and at least one hydrophilic monomer. However, silicone hydrogel lenses can be difficult to produce because the silicone components and the hydrophilic components are often incompatible.

In addition to overall compatibility of reactants, it may also be desirable in some applications to form products from different materials, where the materials are localized in certain regions rather than being distributed throughout. For example, in the ophthalmic device field, processes that allow for regional modification of a device (such as a contact lens) may permit manufacturers to create products with customized lens powers or other desirable properties.

SUMMARY OF THE INVENTION

The invention relates to new polymeric compositions derived from a wide variety of component monomers and polymers, including where such component monomers and polymers are generally incompatible. The invention further relates to processes for selectively modifying the material makeup of a substrate. Such polymeric compositions find use in various applications, for instance in ophthalmic devices.

In one aspect, therefore, the invention provides ophthalmic device formed by a process comprising:

(a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker;

(b) subjecting the first reactive composition to a first activation step such that the first reactive composition polymerizes therein to form a crosslinked substrate network containing a covalently bound activatable free radical initiator;

(c) contacting the crosslinked substrate network with a grafting composition containing one or more ethylenically unsaturated compounds, wherein the contacting is conducted under conditions such that the grafting composition penetrates into the crosslinked substrate network; and (d) activating the covalently bound activatable free radical initiator at one or more selective regions of the crosslinked substrate network such that the grafting composition polymerizes with the crosslinked substrate network at the selective regions.

In another aspect, the invention provides an ophthalmic device comprised of a reaction product of a composition comprising: (i) a crosslinked substrate network containing covalently bound activatable free radical initiators; and (ii) a grafting composition containing one or more ethylenically unsaturated compounds, wherein the grafting composition is localized at selected regions of the crosslinked substrate network.

In a further aspect, the invention provides a process for making an ophthalmic device, the process comprising:

(a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker;

(b) subjecting the first reactive composition to a first activation step such that the first reactive composition polymerizes therein to form a crosslinked substrate network containing a covalently bound activatable free radical initiator;

(c) contacting the crosslinked substrate network with a grafting composition containing one or more ethylenically unsaturated compounds, wherein the contacting is conducted under conditions such that the grafting composition penetrates into the crosslinked substrate network; and (d) activating the covalently bound activatable free radical initiator at one or more selective regions of the crosslinked substrate network such that the grafting composition polymerizes with the crosslinked substrate network at the selective regions.

BRIEF DESCRIPTION OF THE DRAWING

FIG. 2 depicts a contact lens with a grafted cylinder thickness profile according to various embodiments of the invention.

FIG. 3 depicts an ungrafted contact lens and lenses grafted with mPEG500 according to various embodiments of the invention.

DETAILED DESCRIPTION OF THE INVENTION

Figure 1:
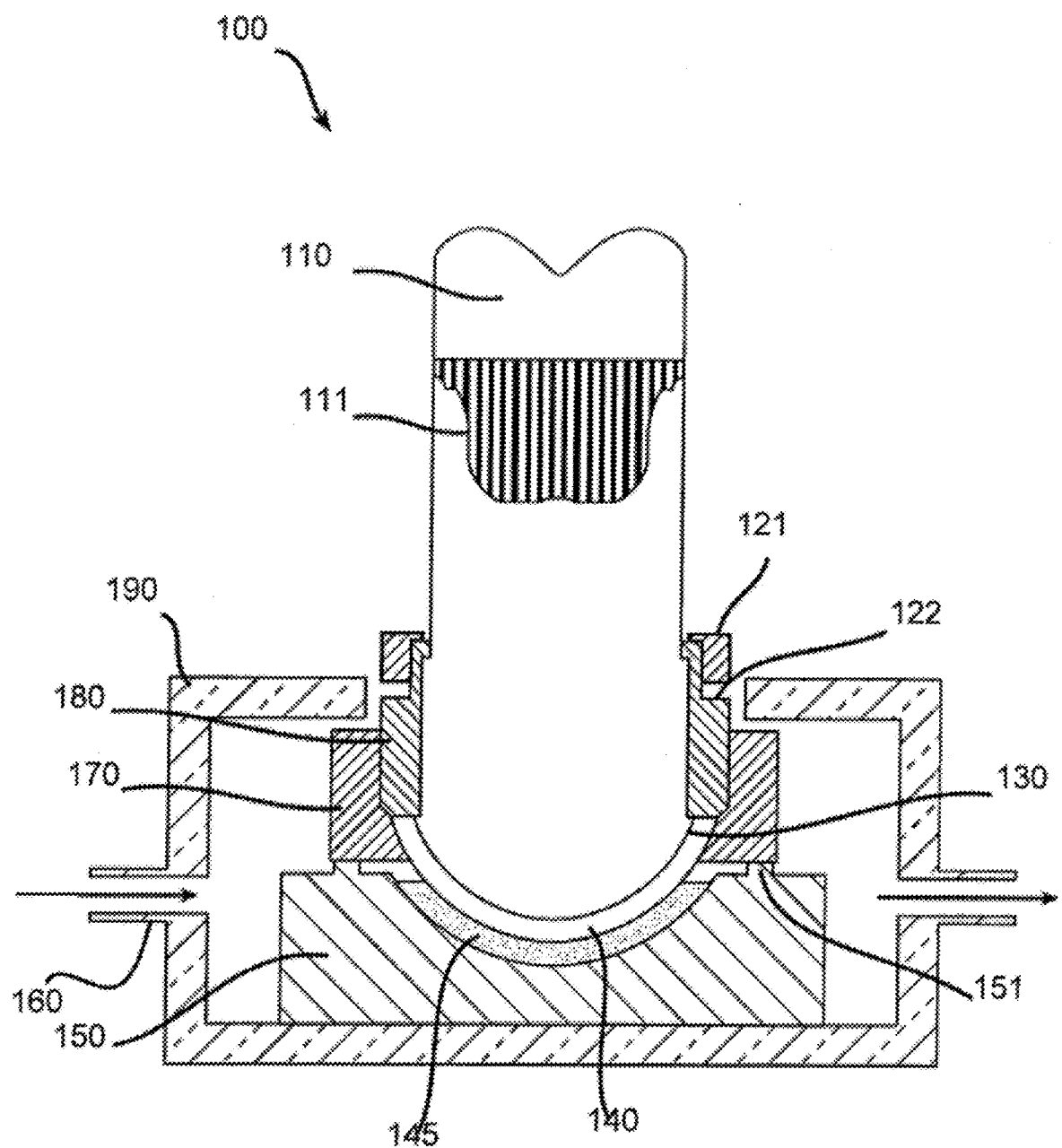
FIG. 1 illustrates voxel-based lithographic apparatus that may be used to implement some embodiments of the invention.

Unless defined otherwise, all technical and scientific terms used herein have the same meaning as commonly understood by one of ordinary skill in the art to which the invention belongs. All publications, patent applications, patents, and other references mentioned herein are incorporated by reference.

Unless otherwise indicated, numeric ranges, for instance as in "from 2 to 10" or as in "between 2 and 10" are inclusive of the numbers defining the range (e.g., 2 and 10).

Unless otherwise indicated, ratios, percentages, parts, and the like are by weight.

The phrase "number average molecular weight" refers to the number average molecular weight ($M_n$) of a sample; the phrase "weight average molecular weight" refers to the weight average molecular weight ($M_w$) of a sample; the phrase "polydispersity index" (PDI) refers to the ratio of $M_w$ divided by $M_n$ and describes the molecular weight distribution of a sample. If the type of "molecular weight" is not indicated or is not apparent from the context, then it is intended to refer to number average molecular weight.

As used herein, the term "about" refers to a range of +/−10 percent of the number that is being modified. For example, the phrase "about 10" would include both 9 and 11.

As used herein, the term "(meth)" designates optional methyl substitution. Thus, a term such as "(meth)acrylate" denotes both methacrylate and acrylate.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

The average number of repeating units in a polymer sample is known as its "degree of polymerization." When a generic chemical formula of a polymer sample, such as [***]n is used, "n" refers to its degree of polymerization, and the formula shall be interpreted to represent the number average molecular weight of the polymer sample.

As used herein, the term "individual" includes humans and vertebrates.

As used herein, the term "ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include soft contact lenses, hard contact lenses, hybrid contact lenses, intraocular lenses, and inlay and overlay lenses. The ophthalmic device preferably may comprise a contact lens.

As used herein, the term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light blocking, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The ophthalmic devices and contact lenses of the invention may be comprised of silicone hydrogels. These silicone hydrogels typically contain at least one hydrophilic monomer and at least one silicone-containing component that are covalently bound to one another in the cured device. The ophthalmic devices and contact lenses of the invention may also be comprised of conventional hydrogels, or combination of conventional and silicone hydrogels.

A "macromolecule" is an organic compound having a number average molecular weight of greater than 1500, and may be reactive or non-reactive.

As used herein, the "target macromolecule" is the intended macromolecule being synthesized from the reactive composition comprising monomers, macromers, prepolymers, cross-linkers, initiators, additives, diluents, and the like.

As used herein, a "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent.

As used herein, a "macromonomer" or "macromer" is a linear or branched macromolecule having at least one polymerizable group that can undergo chain growth polymerization, and in particular, free radical polymerization.

As used herein, the term "polymerizable" means that the compound comprises at least one polymerizable group. "Polymerizable groups" are groups that can undergo chain growth polymerization, such as free radical and/or cationic polymerization, for example a carbon-carbon double bond group which can polymerize when subjected to radical polymerization initiation conditions. Non-limiting examples of polymerizable groups include (meth)acrylates, styrenes, vinyl ethers, (meth)acrylamides, N-vinyllactams, N-vinylamides, O-vinylcarbamates, O-vinylcarbonates, and other vinyl groups. Preferably, the polymerizable groups comprise (meth)acrylates, (meth)acrylamides, and mixtures thereof. Preferably, the polymerizable groups comprise (meth)acrylate, (meth)acrylamide, N-vinyl lactam, N-vinylamide, styryl functional groups, or mixtures of any of the foregoing. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted). In contrast to "polymerizable," the term "non-polymerizable" means that the compound does not comprise such a free radical polymerizable group.

Examples of the foregoing include substituted or unsubstituted $C_{1-6}$alkyl(meth)acrylates, $C_{1-6}$alkyl(meth)acrylamides, $C_{2-12}$alkenyls, $C_{2-12}$alkenylphenyls, $C_{2-12}$alkenylnaphthyls, $C_{2-6}$alkenylphenyl $C_{1-6}$alkyls, where suitable substituents on said $C_{1-6}$ alkyls include ethers, hydroxyls, carboxyls, halogens and combinations thereof.

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

An "ethylenically unsaturated compound" is a monomer, macromer, or prepolymer that contains at least one polymerizable group. An ethylenically unsaturated compound may preferably consist of one polymerizable group.

As used herein, a "silicone-containing component" or "silicone component" is a monomer, macromer, prepolymer, cross-linker, initiator, additive, or polymer in the reactive composition with at least one silicon-oxygen bond, typically in the form of siloxy groups, siloxane groups, carbosiloxane groups, and mixtures thereof. Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers and macromers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into free radical groups which can react with a monomer to initiate a free radical polymerization reaction. A thermal initiator decomposes at a certain rate depending on the temperature; typical examples are azo compounds such as 1,1'-azobisisobutyronitrile and 4,4'-aobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "free radical group" is a molecule that has an unpaired valence electron which can react with a polymerizable group to initiate a free radical polymerization reaction.

A "cross-linking agent" or "crosslinker" is a di-functional or multi-functional monomer which can undergo free radical polymerization at two or more locations on the molecule, thereby creating branch points and a polymeric network. The two or more polymerizable functionalities on the crosslinker may be the same or different and may, for instance, be independently selected from vinyl groups (including allyl), (meth)acrylate groups, and (meth)acrylamide groups. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers (or macromers) which contains remaining polymerizable groups capable of undergoing further reaction to form a polymer.

A "polymeric network" is a type of polymer that is in the form of a cross-linked macromolecule. Generally, a polymeric network may swell but cannot dissolve in solvents. For instance, the crosslinked substrate network of the invention is a material that is swellable, without dissolving.

"Hydrogels" are polymeric networks that swell in water or aqueous solutions, typically absorbing at least 10 weight percent water (at 25° C.). "Silicone hydrogels" are hydrogels that are made from at least one silicone-containing component with at least one hydrophilic component. Hydrophilic components may also include non-reactive polymers.

"Conventional hydrogels" refer to polymeric networks made from monomers without any siloxy, siloxane or carbosiloxane groups. Conventional hydrogels are prepared from reactive compositions predominantly containing hydrophilic monomers, such as 2-hydroxyethyl methacrylate ("HEMA"), N-vinyl pyrrolidone ("NVP"), N, N-dimethylacrylamide ("DMA") or vinyl acetate.

As used herein, the term "reactive composition" refers to a composition containing one or more reactive components (and optionally non-reactive components) which are mixed (when more than one is present) together and, when subjected to polymerization conditions, form polymer compositions. If more than one component is present, the reactive composition may also be referred to herein as a "reactive mixture" or a "reactive monomer mixture" (or RMM). The reactive composition comprises reactive components such as the monomers, macromers, prepolymers, cross-linkers, and initiators, and optional additives such as wetting agents, release agents, dyes, light absorbing compounds such as UV-VIS absorbers, pigments, dyes and photochromic compounds, any of which may be reactive or non-reactive but are preferably capable of being retained within the resulting polymer composition, as well as pharmaceutical and nutraceutical compounds, and any diluents. It will be appreciated that a wide range of additives may be added based upon the final product which is made and its intended use. Concentrations of components of the reactive composition are expressed as weight percentages of all components in the reaction composition, excluding diluent. When diluents are used, their concentrations are expressed as weight percentages based upon the amount of all components in the reaction composition and the diluent.

"Reactive components" are the components in the reactive composition which become part of the chemical structure of the resulting material by covalent bonding, hydrogen bonding, electrostatic interactions, the formation of interpenetrating polymeric networks, or any other means. Examples include, but are not limited to silicone reactive components (e.g., the silicone-containing components described below) and hydrophilic reactive components (e.g., the hydrophilic monomers described below).

As used herein, the term "silicone hydrogel contact lens" refers to a contact lens comprising at least one silicone hydrogel. Silicone hydrogel contact lenses generally have increased oxygen permeability compared to conventional hydrogels. Silicone hydrogel contact lenses use both their water and polymer content to transmit oxygen to the eye.

"DMD" refers to a digital micromirror device that may be a bistable spatial light modulator consisting of an array of movable micromirrors functionally mounted over a CMOS SRAM. Each mirror may be independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees (on) or −X degrees (off). Light reflected by the on mirrors then may be passed through a projection lens and onto a screen. Light may be reflected off to create a dark field, and defines the black-level floor for the image. Images may be created by gray-scale modulation between on and off levels at a rate fast enough to be integrated by the observer. The DMD (digital micromirror device) may comprise DLP projection systems.

"DMD Script" refers to a control protocol for a spatial light modulator and also to the control signals of any system component, for example, a light source or filter wheel, either of which may include a series of command sequences in time.

The term "multi-functional" refers to a component having two or more polymerizable groups. The term "mono-functional" refers to a component having one polymerizable group.

The terms "halogen" or "halo" indicate fluorine, chlorine, bromine, and iodine.

As used herein, the term "alkyl" refers to an unsubstituted or substituted linear or branched alkyl group containing the indicated number of carbon atoms. If no number is indicated, then alkyl (optionally including any substituents on alkyl) may contain 1 to 16 carbon atoms. Preferably, the alkyl group contains 1 to 10 carbon atoms, alternatively 1 to 7 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, amido, carbamate, carbonate, halogen, phenyl, benzyl, and combinations thereof. "Alkylene" means a divalent alkyl group, such as —$CH_2$—, —$CH_2CH_2$—, —$CH_2CH_2CH_2$—, —$CH_2CH(CH_3)CH_2$—, and —$CH_2CH_2CH_2CH_2$—.

"Haloalkyl" refers to an alkyl group as defined above substituted with one or more halogen atoms, where each halogen is independently F, $C_1$, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —$CF_3$— or —$CF_2CF_3$—. "Haloalkylene" means a divalent haloalkyl group, such as —$CH_2CF_2$—.

"Cycloalkyl" refers to an unsubstituted or substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an unsubstituted or substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, amido, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as —$CH_2CH_2NH$—.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —$[Si-O]_n$—, where n is 2 or more). Each silicon atom in the siloxanyl group is substituted with independently selected $R^A$ groups (where $R^A$ is as defined in formula A options (b)-(i)) to complete their valence.

"Silyl" refers to a structure of formula $R_3Si$— and "siloxy" refers to a structure of formula $R_3Si$—O—, where each R in silyl or siloxy is independently selected from trimethylsiloxy, $C_1$-$C_8$ alkyl (preferably $C_1$-$C_3$ alkyl, more preferably ethyl or methyl), and $C_3$-$C_5$ cycloalkyl.

"Alkyleneoxy" refers to groups of the general formula-(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—$[CH_2CH_2O]_p$— or $CH_3O$—

[CH₂CH₂O]$_p$—). Examples of alkyleneoxy include polymethyleneoxy, polyethyleneoxy, polypropyleneoxy, polybutyleneoxy, and poly(ethyleneoxy-co-propyleneoxy).

"Oxaalkylene" refers to an alkylene group as defined above where one or more non-adjacent CH₂ groups have been substituted with an oxygen atom, such as —CH₂CH₂OCH(CH₃)CH₂—. "Thiaalkylene" refers to an alkylene group as defined above where one or more non-adjacent CH₂ groups have been substituted with a sulfur atom, such as —CH₂CH₂SCH(CH₃)CH₂—.

The term "linking group" refers to a moiety that links the polymerizable group to the parent molecule. The linking group may be any moiety that does not undesirably interfere with the polymerization of the compound of which it is a part. For instance, the linking group may be a bond, or it may comprise one or more alkylene, haloalkylene, amide, amine, alkyleneamine, carbamate, carboxylate (—CO₂—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —OCF₂—, —OCF₂CF₂—, —OCF₂CH₂—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate.

Preferred linking groups include $C_1$-$C_8$ alkylene (preferably $C_2$-$C_6$ alkylene) and $C_1$-$C_8$ oxaalkylene (preferably $C_2$-$C_6$ oxaalkylene), each of which is optionally substituted with 1 or 2 groups independently selected from hydroxyl and siloxy. Preferred linking groups also include carboxylate, amide, $C_1$-$C_8$ alkylene-carboxylate-$C_1$-$C_8$ alkylene, or $C_1$-$C_8$ alkylene-amide-$C_1$-$C_8$ alkylene.

When the linking group is comprised of combinations of moieties as described above (e.g., alkylene and cycloalkylene), the moieties may be present in any order. For instance, if in Formula E below, L is indicated as being-alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg) to which the linking group is attached. For example, if in Formula E, L and L² are indicated as both being alkylene-cycloalkylene, then Rg-L is preferably Rg-alkylene-cycloalkylene- and -L²-Rg is preferably-cycloalkylene-alkylene-Rg.

As noted above, in one aspect, the invention provides an ophthalmic device formed by a process comprising:

(a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker;

(b) subjecting the first reactive composition to a first activation step such that the first reactive composition polymerizes therein to form a crosslinked substrate network containing a covalently bound activatable free radical initiator;

(c) contacting the crosslinked substrate network with a grafting composition containing one or more ethylenically unsaturated compounds, wherein the contacting is conducted under conditions such that the grafting composition penetrates into the crosslinked substrate network; and (d) activating the covalently bound activatable free radical initiator at one or more selective regions of the crosslinked substrate network such that the grafting composition polymerizes with the crosslinked substrate network at the selective regions.

The polymerization initiator may be any composition with the ability to generate free radical groups in two or more separate activation steps. There is no particular requirement in the invention with respect to what type of polymerization initiator is used or the mechanism of activation, as long as the first activation and the second activation can be conducted sequentially. Thus, suitable polymerization initiators may, for example, be activated thermally, by visible light, by ultraviolet light, via electron beam irradiation, by gamma ray irradiation, or combinations thereof. Examples of polymerization initiators for use in the invention include, without limitation, bisacylphosphine oxides ("BAPO"), bis(acyl)phosphane oxides (e.g., bis(mesitoyl)phosphinic acid), azo compounds, peroxides, alpha-hydroxy ketones, alpha-alkoxy ketones, 1, 2-diketones, germanium based compounds (such as bis(4-methoxybenzoyl)diethylgermanium), or combinations thereof.

BAPO initiators are preferred. Examples of suitable BAPO initiators include, without limitation, compounds having the chemical structure of formula I:

Formula I

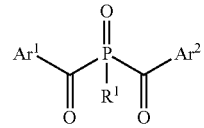

wherein Ar¹ and Ar² are independently substituted or unsubstituted aryl groups, typically substituted phenyl groups, wherein the substituents are linear, branched, or cyclic alkyl groups, such as methyl groups, linear, branched, or cyclic alkoxy groups, such as methoxy groups, and halogen atoms; preferably Ar¹ and Ar² have identical chemical structures; and wherein R¹ is a linear, branched, or cyclic alky group having from 1 to 10 carbon atoms, or R¹ is a phenyl group, a hydroxyl group, or an alkoxy group having from 1 to 10 carbon atoms.

It should be noted that polymerization initiators that are activatable by different types of energy for the initial and subsequent activations may be used. For instance, materials that undergo a first thermal activation and a second activation via irradiation are within the scope of the invention. Examples of such mixed activation materials include compounds of formulae II, III, IV, and V:

Formula II

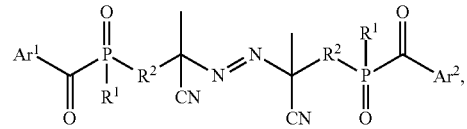

-continued

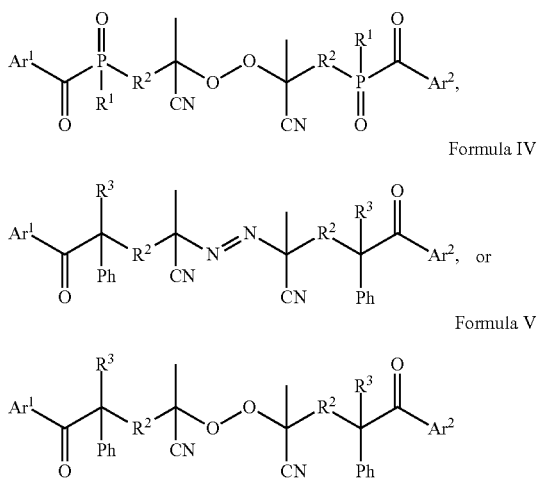

Formula III

Formula IV

Formula V wherein $Ar^1$ and $Ar^2$ are independently substituted or unsubstituted aryl groups, typically substituted phenyl groups, wherein the substituents are linear, branched, or cyclic alkyl groups, such as methyl groups, linear, branched, or cyclic alkoxy groups, such as methoxy groups, and halogen atoms; preferably $Ar^1$ and $Ar^2$ have identical chemical structures; and wherein $R^1$ is a linear, branched, or cyclic alkyl group having from 1 to 10 carbon atoms; wherein $R^2$ is difunctional methylene linking group that may further comprise ether, ketone, or ester groups along the methylene chain having from 1 to 10 carbon atoms; and $R^3$ is a hydrogen atom, a hydroxyl group, or a linear, branched, or cyclic alkoxy group having from 1 to 10 carbon atoms. A further example is tert-butyl 7-methyl-7-(tert-butylazo)peroxyoctanoate.

Furthermore, diazo compounds, diperoxy compounds, or azo-peroxy compounds that exhibit two distinct decomposition temperatures may be used in the prevent invention.

Preferably, the polymerization initiator is a photopolymerization initiator, preferably a bisacylphosphine oxide. Bisacylphosphine oxides are desirable because they can undergo sequential activations steps at different wavelengths and are therefore simple to use. At the longer wavelength, bisacylphosphine oxides can form two free radical groups, one of which is a monoacylphosphine oxide. The monacylphosphine oxide (MAPO) can then undergo a second activation, typically at a shorter wavelength. A particularly preferred bisacylphosphine oxide is bis(2,4,6-trimethylbenzoyl) phenylphosphine oxide, for which the longer wavelength is typically above 420 nm (e.g., 435 nm and above) and the shorter wavelength is typically 420 nm and below. It may be preferable to use an LED or equivalent light in which the bandwidths are relatively narrow as the radiation source, thereby allowing initial irradiation while preserving some or most of the MAPO groups in the crosslinked substrate network.

Other exemplary bisacylphosphine oxide compounds that may be used include bis-(2,6-dimethoxybenzoyl)-2,4,4-trimethylpenthylphosphine oxide, bis(2,4,6-trimethylbenzoyl)-2,4,4-trimethylpenthylphosphine oxide, or bis(2,4,6-trimethylbenzoyl)phosphinic acid or salt thereof.

In the invention, the first reactive composition, which contains the polymerization initiator, one or more ethylenically unsaturated compounds, and a crosslinker, is subjected to a first activation step under conditions that cause the polymerization initiator to undergo its initial activation. For example, if the polymerization initiator is a BAPO, the first reactive composition may be irradiated at 435 nm or above using an appropriate light source. The first reactive composition consequently polymerizes to form a crosslinked substrate network. The crosslinked substrate network contains the residue of the polymerization initiator as a covalently bound activatable free radical initiator.

The activation and polymerization of the first reactive composition may be carried out using techniques known to those skilled in the art. For example, the reactive components of the first reactive composition may be mixed in a vessel. A diluent may optionally be used to facilitate the mixing. The mixture may be filtered, degassed, and heated to a desired temperature and then irradiated under conditions to cause a first activation of the polymerization initiator and consequent formation of the crosslinked substrate network. The vessel for the polymerization may be a mold, for instance where it is desired for the product to have a specific shape. For example, the first reactive composition may be dosed and polymerized within the cavity of a mold pair (e.g., front and back molds). Preferably, the first crosslinked substrate network for use in ophthalmic devices of the invention is a conventional or a silicone hydrogel. More preferably, it is a silicone hydrogel.

According to the invention, the crosslinked substrate network formed as described above is contacted with a grafting composition. The grafting composition contains one or more ethylenically unsaturated compounds. The crosslinked substrate network is a swellable material and therefore absorbs at least some grafting composition for the subsequent grafting reaction. Absorption into the crosslinked substrate network may be carried out in various ways. For instance, the crosslinked substrate network may be placed in the grafting composition and allowed to swell. Or the crosslinked substrate network may be first swollen in a solvent and then combined with the grafting composition, e.g., by suspending the pre-swollen crosslinked substrate network in the grafting composition, during which the reactive components partition into the crosslinked substrate network by molecular diffusion and fluid exchange prior. There is no particular minimum amount of the grafting composition that should absorb into the crosslinked substrate network as long as some is present (greater than 0 weight percent of reactive components). In some embodiments, it may be preferable for the crosslinked substrate network to be swellable in the grafting composition by at least 0.0001 weight percent, alternatively at least 0.01 weight percent, alternatively at least 0.1 weight percent, alternatively at least 5 weight percent, alternatively at least 10 weight percent, or alternatively at least 25 weight percent, at 25° C., relative to its dry weight.

Following the contacting of the crosslinked substrate network with the grafting composition, at least some of the activatable free radical initiator of the crosslinked substrate network is activated. For example, if the polymerization initiator used in step (a) of the process is a BAPO, then free radical initiator covalently bound to the crosslinked substrate network (in this example, a monoacylphosphine oxide) may be activated by irradiation at 420 nm or below using an appropriate light source. According to the invention, the activation may be conducted at one or more selective (localized) regions of the crosslinked substrate network. The grafting composition then undergoes polymerization at the selective regions and covalently grafts with the crosslinked substrate network via the free radical initiator in the substrate. The product is thus an ophthalmic device having localized regions or volumes that comprise a grafted polymeric network. Ungrafted composition may be removed from the network, for instance by extraction with a solvent.

The grafting at selective regions of the substrate network allows a manufacturer to change the chemical composition of the device at those regions. As a result, new devices can be prepared that exhibit desirable features or properties. By way of non-limiting example, in the contact lens field, the process may allow for refractive modification of hydrogel materials to create custom lens powers. This may be achieved by grafting, at selective regions of the crosslinked substrate network, a material that has different swelling characteristics than the material of the substrate. This allows for the lens topography to be shaped in a way that generates custom lens powers.

Various techniques may be used for the selective activation of the covalently bound free radical initiator, present in the crosslinked substrate network, to permit localized grafting as described above. A preferred technique is voxel-based lithography as generally described, for example, in US20150146159, U.S. Pat. Nos. 9,075,186, and 8,317,505, each of which is incorporated herein by reference in its entirety. Additional references include U.S. Pat. Nos. 7,905,594, 8,157,373, 8,240,849, 8,313,828, 8,318,055, 8,795,558, 9,180,633, 9,180,634, 9,417,464, 9,610,742, and 9,857,607, each of which is incorporated herein by reference in its entirety.

An exemplary voxel-based lithographic apparatus that may be used in the invention is shown in FIG. 1.

Referring to FIG. 1, the voxel-based lithograph optical forming apparatus 100 may include a source of actinic radiation 110, a spatial grid 111, a forming optic 130 having a forming optic surface 140. In some exemplary embodiments of the forming apparatus 100, the radiation or light may impinge in a roughly vertical manner to the surface 140 of the forming optic 130. The forming optic 130 may be held in place via a retaining ring 121 or other fastening device, which may maintain the correct orientation of the optical system relative to the forming optic 130. Other paths that light may take on a voxel by voxel basis across the optic surface 140 may be apparent and are within the scope of the inventive art.

In exemplary embodiments where the relative orientation of a reservoir 150, which may be empty or may contain a liquid 145 such as the grafting composition, and forming optic 130 to the light beam may be significant, additional mechanisms for their interlocked location may be included, for example, a forming optic retaining member 170 with associated interlocking features 180 and 122. The alignment between the retaining member 170 and interlocking features 180 and 122 may also provide for position control of the centering of the reservoir 150 to the forming optic surface 140. The position control may be enhanced in some exemplary embodiments with a spacing ring 151, which may also control the volume of material added to the reservoir 150.

The reservoir 150 may be enclosed in a containment vessel 190 that may exclude ambient gasses, such as oxygen. The exclusion may be enhanced by flowing an inert gas, such as nitrogen, through a tube or channel 160 included in the containment vessel 190. In other exemplary embodiments, the oxygen level may be managed by controlling the dilution of oxygen in the gas flowed through the channel 160 included in the containment vessel 190.

The forming optic 130 may be made from numerous optically transparent materials, wherein a light beam, such as actinic radiation, may pass through the forming optic 130 and impinge on the target. For example, the forming optic 130 may comprise fused quartz or transparent polymeric materials.

In some exemplary embodiments, a crosslinked substrate network may first be formed in a mold as describe above. The crosslinked substrate network may then be positioned (not shown) on the forming optic surface 140 and contacted with grafting composition 145 contained in the reservoir 150. Alternatively, a crosslinked substrate network may be formed, for instance in a mold as described above, and contacted with the grafting composition outside of the voxel-based lithograph optical forming apparatus. The crosslinked substrate network, containing grafting composition, may then be positioned (not shown) on the forming optic surface 140. In this embodiment, the reservoir 150 may be empty or it may, for example, contain solvents, water, or additional grafting composition.

Actinic radiation 110, which may be controlled and varied across a spatial grid 111, may be applied to the crosslinked lens substrate (containing grafting composition) at the appropriate wavelength for activating the substrate's covalently bound activatable free radical initiators. The actinic radiation 110 may be controlled such that it impinges at selective locations on the crosslinked substrate network, resulting in localized activation of the covalently bound initiators with consequent grafting at only those locations. Various techniques may be used to control the actinic radiation such that it impinges only at the desired locations of the crosslinked substrate network. For instance, a digital micromirror device (DMD) and DMD script along with various associated components may be used, as described in U.S. Pat. No. 9,075,186.

While voxel-based lithography as described above is a preferred technique for the selective activation of the crosslinked substrate network, other techniques may also be utilized. For example, selective activation may be provided by simply masking, from the activating light, those areas of the crosslinked substrate network where activation is not desired. The non-masked areas of the substrate may then undergo activation and grafting. Unreacted material may be removed, for instance by extraction.

Additional optional grafting steps may be added. Such additional grafting may, for instance, be through the bulk of the substrate, or it may be more concentrated at the surface than at the core, or it may be localized as selected regions of the substrate. For instance, following the above-described localized grafting, the grafted crosslinked substrate network may be contacted with a second grafting composition containing one or more ethylenically unsaturated compounds. Such second composition may be grafted onto the substrate if the substrate contains residual covalently bound activatable free radical initiators.

It should be noted that the free radical initiator covalently bound to the crosslinked substrate network forms two free radical groups when activated, one of which may not be covalently bound to the substrate. Consequently, some of the reactive components in the grafting composition may polymerize via the unbound free radical group to form a polymer that is not covalently bound with the network. Such polymer is referred to herein as a "byproduct polymer." This byproduct polymer may be induced to covalently bind with the grafted polymeric network by inclusion of a crosslinking agent in the grafting composition. The composition may contain at least a portion of the byproduct polymer that is not covalently bound to the grafted polymeric network. To achieve this, the polymerization of the grafting composition is conducted in the substantial absence of a crosslinker. By "substantial absence of a crosslinker" is meant that any crosslinker used in the grafting composition is present in less than a stoichiometric amount. In some embodiments, no crosslinker is present in the grafting composition.

The first reactive composition and the grafting compositions of the invention contain ethylenically unsaturated compounds as reactive components. The ethylenically unsaturated compounds undergo polymerization to form the polymer compositions described herein. As will be appreciated, a wide variety of ethylenically unsaturated compounds may be used in the invention.

The ethylenically unsaturated compounds may be the same or different between the first reactive composition and the grafting composition, although in some embodiments, it is preferable that at least some of the ethylenically unsaturated compounds in each composition are different. By using materials for the first reactive composition that are different from the grafting composition, it becomes possible to design ophthalmic devices that combine desirable properties from materials that may otherwise not be readily compatible. This is one of the advantages of the invention.

The ethylenically unsaturated compound for inclusion in the first reactive composition and/or the grafting composition may comprise an independently selected silicone-containing component.

The silicone-containing component may comprise one or more compounds selected from monomers or macromer, where each compound may independently comprise at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyllactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, or mixtures of the foregoing; one or more optionally repeating siloxane units; and one or more linking groups connecting the polymerizable groups to the siloxane units.

Formula A.

The silicone-containing component may comprise one or more siloxane monomers or macromers of Formula A:

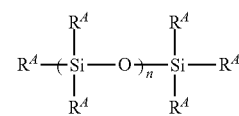

Formula A wherein:
at least one $R^A$ is a group of formula $R_g$-L- wherein $R_g$ is a polymerizable group and L is a linking group, and the remaining $R^A$ are each independently:
(a) Rg-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof,
(c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof,
(d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof,
(e) halo,
(f) alkoxy, cyclic alkoxy, or aryloxy,
(g) siloxy,
(h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or
(i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Formula B.

The silicone-containing component of formula A may be a mono-functional compound of formula B:

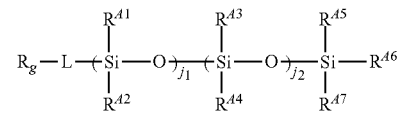

Formula B wherein:
Rg is a polymerizable group;
L is a linking group;
j1 and j2 are each independently whole numbers from 0 to 220, provided that the sum of j1 and j2 is from 1 to 220;
$R^{A1}$, $R^{A2}$, $R^{A3}$, $R^{A4}$, $R^{A5}$, and $R^{A7}$ are independently at each occurrence $C_1$-$C_6$ alkyl, $C_3$-$C_{12}$ cycloalkyl, $C_1$-$C_6$ alkoxy, $C_4$-$C_{12}$ cyclic alkoxy, alkoxy-alkyleneoxy-alkyl, aryl (e.g., phenyl), aryl-alkyl (e.g., benzyl), haloalkyl (e.g., partially or fully fluorinated alkyl), siloxy, fluoro, or combinations thereof, wherein each alkyl in the foregoing groups is optionally substituted with one or more hydroxy, amino, amido, oxa, carboxy, alkyl carboxy, carbonyl, alkoxy, carbamate, carbonate, halo, phenyl, or benzyl, each cycloalkyl is optionally substituted with one or more alkyl, hydroxy, amino, amido, oxa, carbonyl, alkoxy, carbamate, carbonate, halo, phenyl, or benzyl and each aryl is optionally substituted with one or more alkyl, hydroxy, amino, amido, oxa, carboxy, alkyl carboxy, carbonyl, alkoxy, carbamate, carbonate, halo, phenyl, or benzyl; and $R^{46}$ is siloxy, $C_1$-$C_8$ alkyl (e.g., $C_1$-$C_4$ alkyl, or butyl, or methyl), or aryl (e.g., phenyl), wherein alkyl and aryl may optionally be substituted with one or more fluorine atoms.

Formula B-1.

Compounds of formula B may include compounds of formula B-1, which are compounds of formula B wherein j1 is zero and j2 is from 1 to 220, or j2 is from 1 to 100, or j2 is from 1 to 50, or j2 is from 1 to 20, or j2 is from 1 to 5, or j2 is 1.

B-2.

Compounds of formula B may include compounds of formula B-2, which are compounds of formula B wherein j1 and j2 are independently from 4 to 100, or from 4 to 20, or from 4 to 10, or from 24 to 100, or from 10 to 100.

B-3.

Compounds of formulae B, B-1, and B-2 may include compounds of formula B-3, which are compounds of formula B, B-1, or B-2 wherein $R^{41}$, $R^{42}$, $R^{43}$, and $R^{44}$ are independently at each occurrence $C_1$-$C_6$ alkyl or siloxy. Preferred alkyl are $C_1$-$C_3$ alkyl, or more preferably, methyl. Preferred siloxy is trimethylsiloxy.

B-4.

Compounds of formulae B, B-1, B-2, and B-3 may include compounds of formula B-4, which are compounds of formula B, B-1, B-2, or B-3 wherein $R^{45}$ and $R^{47}$ are independently alkoxy-alkyleneoxy-alkyl, preferably they are independently a methoxy capped polyethyleneoxyalkyl of formula $CH_3O$—$[CH_2CH_2O]_p$—$CH_2CH_2CH_2$, wherein p is a whole number from 1 to 50.

B-5.

Compounds of formulae B, B-1, B-2, and B-3 may include compounds of formula B-5, which are compounds of formula B, B-1, B-2, or B-3 wherein $R^{45}$ and $R^{47}$ are independently siloxy, such as trimethylsiloxy.

B-6.

Compounds of formulae B, B-1, B-2, and B-3 may include compounds of formula B-6, which are compounds of formula B, B-1, B-2, or B-3 wherein $R^{45}$ and $R^{47}$ are independently $C_1$-$C_6$ alkyl, alternatively $C_1$-$C_4$ alkyl, or alternatively, butyl or methyl.

B-7.

Compounds of formulae B, B-1, B-2, B-3, B-4, B-5, and B-6 may include compounds of formula B-7, which are compounds of formula B, B-1, B-2, B-3, B-4, B-5, or B-6 wherein $R^{46}$ is $C_1$-$C_8$ alkyl, preferably $C_1$-$C_6$ alkyl, more preferably $C_1$-$C_4$ alkyl (for example methyl, ethyl, n-propyl, or n-butyl). More preferably $R^{46}$ is n-butyl.

B-8.

Compounds of formulae B, B-1, B-2, B-3, B-4, B-5, B-6, and B-7, may include compounds of formula B-8, which are compounds of formula B, B-1, B-2, B-3, B-4, B-5, B-6, or B-7 wherein Rg comprises styryl, vinyl carbonate, vinyl ether, vinyl carbamate, N-vinyl lactam, N-vinylamide, (meth)acrylate, or (meth)acrylamide. Preferably, Rg comprises (meth)acrylate, (meth)acrylamide, or styryl. More preferably, Rg comprises (meth)acrylate or (meth)acrylamide. When Rg is (meth)acrylamide, the nitrogen group may be substituted with $R^{49}$, wherein $R^{49}$ is H, $C_1$-$C_8$ alkyl (preferably $C_1$-$C_4$ alkyl, such as n-butyl, n-propyl, methyl or ethyl), or $C_3$-$C_8$ cycloalkyl (preferably $C_5$-$C_6$ cycloalkyl), wherein alkyl and cycloalkyl are optionally substituted with one or more groups independently selected from hydroxyl, amide, ether, silyl (e.g., trimethylsilyl), siloxy (e.g., trimethylsiloxy), alkyl-siloxanyl (where alkyl is itself optionally substituted with fluoro), aryl-siloxanyl (where aryl is itself optionally substituted with fluoro), and silyl-oxaalkylene- (where the oxaalkylene is itself optionally substituted with hydroxyl).

B-9.

Compounds of formulae B, B-1, B-2, B-3, B-4, B-5, B-6, B-7, and B-8 may include compounds of formula B-9, which are compounds of formula B, B-1, B-2, B-3, B-4, B-5, B-6, B-7, or B-8 wherein the linking group comprises alkylene (preferably $C_1$-$C_4$ alkylene), cycloalkylene (preferably $C_5$-$C_6$ cycloalkylene), alkyleneoxy (preferably ethyleneoxy), haloalkyleneoxy (preferably haloethyleneoxy), amide, oxaalkylene (preferably containing 3 to 6 carbon atoms), siloxanyl, alkylenesiloxanyl, carbamate, alkyleneamine (preferably $C_1$-$C_6$ alkyleneamine), or combinations of two or more thereof, wherein the linking group is optionally substituted with one or more substituents independently selected from alkyl, hydroxyl, ether, amine, carbonyl, siloxy, and carbamate.

B-10.

Compounds of formulae B, B-1, B-2, B-3, B-4, B-5, B-6, B-7, B-8, and B-9 may include compounds of formula B-10, which are compounds of formula B, B-1, B-2, B-3, B-4, B-5, B-6, B-7, B-8, or B-9 wherein the linking group is alkylene-siloxanyl-alkylene-alkyleneoxy-, or alkylene-siloxanyl-alkylene-[alkyleneoxy-alkylene-siloxanyl]$_q$-alkyleneoxy-, where q is from 1 to 50.

B-11.

Compounds of formulae B, B-1, B-2, B-3, B-4, B-5, B-6, B-7, B-8, and B-9 may include compounds of formula B-11, which are compounds of formula B, B-1, B-2, B-3, B-4, B-5, B-6, B-7, B-8, or B-9 wherein the linking group is $C_1$-$C_6$ alkylene, preferably $C_1$-$C_3$ alkylene, more preferably n-propylene.

B-12.

Compounds of formulae B, B-1, B-2, B-3, B-4, B-5, B-6, B-7, B-8, and B-9 may include compounds of formula B-12, which are compounds of formula B, B-1, B-2, B-3, B-4, B-5, B-6, B-7, B-8, or B-9 wherein the linking group is alkylene-carbamate-oxaalkylene. Preferably, the linking group is $CH_2CH_2N(H)$—$C(\!=\!O)$—$O$—$CH_2CH_2$—$O$—$CH_2CH_2CH_2$.

B-13.

Compounds of formulae B, B-1, B-2, B-3, B-4, B-5, B-6, B-7, B-8, and B-9 may include compounds of formula B-13, which are compounds of formula B, B-1, B-2, B-3, B-4, B-5, B-6, B-7, B-8, or B-9 wherein the linking group is oxaalkylene. Preferably, the linking group is $CH_2CH_2$—$O$—$CH_2CH_2CH_2$.

B-14.

Compounds of formulae B, B-1, B-2, B-3, B-4, B-5, B-6, B-7, B-8, and B-9 may include compounds of formula B-14, which are compounds of formula B, B-1, B-2, B-3, B-4, B-5, B-6, B-7, B-8, or B-9 wherein the linking group is alkylene-[siloxanyl-alkylene]$_q$-, where q is from 1 to 50. An example of such a linking group is: —$(CH_2)_3$—$[Si(CH_3)_2$—$O$—$Si(CH_3)_2$—$(CH_2)_2]_q$—.

B-15.

Compounds of formulae B, B-1, B-2, B-3, B-4, B-5, B-6, B-7, B-8, and B-9 may include compounds of formula B-15, which are compounds of formula B, B-1, B-2, B-3, B-4, B-5, B-6, B-7, B-8, or B-9 wherein the linking group is alkyleneoxy-carbamate-alkylene-cycloalkylene-carbamate-oxaalkylene, wherein cycloalkylene is optionally substituted with or 1, 2, or 3 independently selected alkyl groups (preferably $C_1$-$C_3$ alkyl, more preferably methyl). An example of such a linking group is —[OCH$_2$CH$_2$]$_q$—OC(=O)—NH—CH$_2$-[1,3-cyclohexylene]-NHC(=O)O—CH$_2$CH$_2$—O—CH$_2$CH$_2$—, wherein the cyclohexylene is substituted at the 1 and 5 positions with 3 methyl groups.

B-16.

Compounds of formulae B, B-1, B-2, B-3, B-4, B-5, B-6, B-7, B-8, and B-9 may include compounds of formula B-16, which are compounds of formula B, B-1, B-2, B-3, B-4, B-5, B-6, B-7, B-8, or B-9 wherein Rg comprises styryl and the linking group is alkyleneoxy wherein each alkylene in alkyleneoxy is independently optionally substituted with hydroxyl. An example of such a linking group is —O—(CH$_2$)$_3$—. Another example of such a linking group is —O—CH$_2$CH(OH)CH$_2$—O—(CH$_2$)$_3$—.

B-17.

Compounds of formulae B, B-1, B-2, B-3, B-4, B-5, B-6, B-7, B-8, and B-9 may include compounds of formula B-17, which are compounds of formula B, B-1, B-2, B-3, B-4, B-5, B-6, B-7, B-8, or B-9 wherein Rg comprises styryl and the linking group is alkyleneamine. An example of such a linking group is —NH—(CH$_2$)$_3$—.

B-18.

Compounds of formulae B, B-1, B-2, B-3, B-4, B-5, B-6, B-7, B-8, and B-9 may include compounds of formula B-18, which are compounds of formula B, B-1, B-2, B-3, B-4, B-5, B-6, B-7, B-8, or B-9 wherein the linking group is oxaalkylene optionally substituted with hydroxyl, siloxy, or silylalkyleneoxy (where the alkyleneoxy is itself optionally substituted with hydroxyl). An example of such a linking group is —CH$_2$CH(G)CH$_2$—O—(CH$_2$)$_3$—, wherein G is hydroxyl. In another example, G is R$_3$SiO— wherein two R groups are trimethylsiloxy and the third is $C_1$-$C_8$ alkyl (preferably $C_1$-$C_3$ alkyl, more preferably methyl) or the third is $C_3$-$C_8$ cycloalkyl. In a further example, G is R$_3$Si—(CH$_2$)$_3$ —O—CH$_2$CH(OH)CH$_2$—O—, wherein two R groups are trimethylsiloxy and the third is $C_1$-$C_8$ alkyl (preferably $C_1$-$C_3$ alkyl, more preferably methyl) or $C_3$-$C_5$ cycloalkyl. In a still further example, G is a polymerizable group, such as (meth)acrylate. Such compounds may function as crosslinkers.

B-19.

Compounds of formulae B, B-1, B-2, B-3, B-4, B-5, B-6, B-7, B-8, and B-9 may include compounds of formula B-19, which are compounds of formula B, B-1, B-2, B-3, B-4, B-5, B-6, B-7, B-8, or B-9 wherein Rg comprises styryl and the linking group is amine-oxaalkylene optionally substituted with hydroxyl. An example of such a linking group is —NH—CH$_2$CH(OH)CH$_2$—O—(CH$_2$)$_3$—.

B-20.

Compounds of formulae B, B-1, B-2, B-3, B-4, B-5, B-6, B-7, B-8, and B-9 may include compounds of formula B-20, which are compounds of formula B, B-1, B-2, B-3, B-4, B-5, B-6, B-7, B-8, or B-9 wherein Rg comprises styryl and the linking group is alkyleneoxy-carbamate-oxaalkylene. An example of such a linking group is —O—(CH$_2$)$_2$—N(H)C(=O)O—(CH$_2$)$_2$—O—(CH$_2$)$_3$—.

B-21.

Compounds of formulae B, B-1, B-2, B-3, B-4, B-5, B-6, B-7, B-8, and B-9 may include compounds of formula B-21, which are compounds of formula B, B-1, B-2, B-3, B-4, B-5, B-6, B-7, B-8, or B-9 wherein the linking group is alkylene-carbamate-oxaalkylene. An example of such a linking group is —(CH$_2$)$_2$—N(H)C(=O)O—(CH$_2$)$_2$—O—(CH$_2$)$_3$—.

Formula C.

Silicone-containing components of formulae A, B, B-1, B-2, B-3, B-4, B-5, B-6, B-7, B-8, B-9, B-10, B-11, B-12, B-13, B-14, B-15, B-18, and B-21 may include compounds of formula C, which are compounds of formula A, B, B-1, B-2, B-3, B-4, B-5, B-6, B-7, B-8, B-9, B-10, B-11, B-12, B-13, B-14, B-15, B-18, or B-21 having the structure:

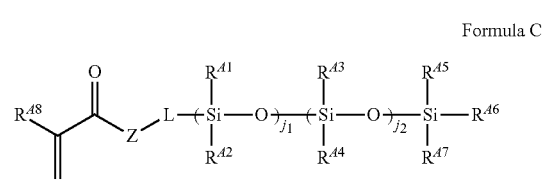

Formula C wherein

R$^{A8}$ is hydrogen or methyl;

Z is O, S, or N(R$^{A9}$); and

L, j1, j2, R$^{A1}$, R$^{A2}$, R$^{A3}$, R$^{A4}$, R$^{A5}$, R$^{A6}$, R$^{A7}$, and R$^{A9}$ are as defined in formula B or its various sub-formulae (e.g., B-1, B-2, etc.).

C-1.

Compounds of formula C may include (meth)acrylates of formula C-1, which are compounds of formula C wherein Z is O.

C-2.

Compounds of formula C may include (meth)acrylamides of formula C-2, which are compounds of formula C wherein Z is N(R$^{A9}$), and R$^{A9}$ is H.

C-3.

Compounds of formulae C may include (meth)acrylamides of formula C-3, which are compounds of formula C wherein Z is N(R$^{A9}$), and R$^{A9}$ is $C_1$-$C_8$ alkyl that is unsubstituted or is optionally substituted as indicated above. Examples of R$^{A9}$ include CH$_3$, —CH$_2$CH(OH)CH$_2$(OH), —(CH$_2$)$_3$-siloxanyl, —(CH$_2$)$_3$—SiR$_3$, and —CH$_2$CH(OH)CH$_2$—O—(CH$_2$)$_3$—SiR$_3$ where each R in the foregoing groups is independently selected from trimethylsiloxy, $C_1$-$C_8$ alkyl (preferably $C_1$-$C_3$ alkyl, more preferably methyl), and $C_3$-$C_5$ cycloalkyl. Further examples of R$^{A9}$ include: —(CH$_2$)$_3$—Si(Me)(SiMe$_3$)$_2$, and —(CH$_2$)$_3$—Si(Me$_2$)-[O—SiMe$_2$]$_{1-10}$—CH$_3$.

Formula D.

Compounds of formula C may include compounds of formula D:

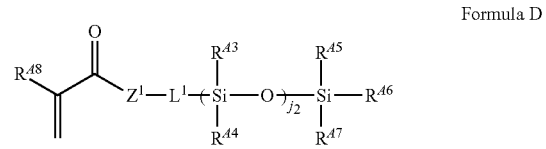

Formula D wherein

R$^{A8}$ is hydrogen or methyl;

Z$^1$ is O or N(R$^{A9}$);

L$^1$ is alkylene containing 1 to 8 carbon atoms, or oxaalkylene containing 3 to 10 carbon atoms, wherein L$^1$ is optionally substituted with hydroxyl; and j2, $R^{43}$, $R^{44}$, $R^{45}$, $R^{46}$, $R^{47}$, and $R^{49}$ are as defined above in formula B or its various sub-formulae (e.g., B-1, B-2, etc.).

D-1.

Compounds of formula D may include compounds of formula D-1, which are compounds of formula D wherein $L^1$ is $C_2$-$C_5$ alkylene optionally substituted with hydroxyl.

Preferably $L^1$ is n-propylene optionally substituted with hydroxyl.

D-2.

Compounds of formula D may include compounds of formula D-2, which are compounds of formula D wherein $L^1$ is oxaalkylene containing 4 to 8 carbon atoms optionally substituted with hydroxyl. Preferably $L^1$ is oxaalkylene containing five or six carbon atoms optionally substituted with hydroxyl. Examples include —$(CH_2)_2$—O—$(CH_2)_3$—, and —$CH_2CH(OH)CH_2$—O—$(CH_2)_3$—.

D-3.

Compounds of formulae D, D-1, and D-2 may include compounds of formula D-3, which are compounds of formula D, D-1, or D-2 wherein $Z^1$ is O.

D-4.

Compounds of formulae D, D-1, and D-2 may include compounds of formula D-4, which are compounds of formula D, D-1, or D-2 wherein $Z^1$ is $N(R^{49})$, and $R^{49}$ is H.

D-5.

Compounds of formulae D, D-1, and D-2 may include compounds of formula D-5, which are compounds of formula D, D-1, or D-2 wherein $Z^1$ is $N(R^{49})$, and $R^{49}$ is $C_1$-$C_4$ alkyl optionally substituted with 1 or 2 substituents selected from hydroxyl, siloxy, and $C_1$-$C_6$ alkyl-siloxanyl-.

D-6.

Compounds of formulae D, D-1, D-2, D-3, D-4, and D-5 may include compounds of formula D-6, which are compounds of formula D, D-1, D-2, D-3, D-4, or D-5 wherein j2 is 1.

D-7.

Compounds of formulae D, D-1, D-2, D-3, D-4, and D-5 may include compounds of formula D-7, which are compounds of formula D, D-1, D-2, D-3, D-4, or D-5 wherein j2 is from 2 to 220, or from 2 to 100, or from 10 to 100, or from 24 to 100, or from 4 to 20, or from 4 to 10.

D-8.

Compounds of formulae D, D-1, D-2, D-3, D-4, D-5, D-6, and D-7 may include compounds of formula D-8, which are compounds of formula D, D-1, D-2, D-3, D-4, D-5, D-6, or D-7 wherein $R^{43}$, $R^{44}$, $R^{45}$, $R^{46}$, and $R^{47}$ are independently $C_1$-$C_6$ alkyl or siloxy. Preferably $R^{43}$, $R^{44}$, $R^{45}$, $R^{46}$, and $R^{47}$ are independently selected from methyl, ethyl, n-propyl, n-butyl, and trimethylsiloxy. More preferably, $R^{43}$, $R^{44}$, $R^{45}$, $R^{46}$, and $R^{47}$ are independently selected from methyl, n-butyl, and trimethylsiloxy.

D-9.

Compounds of formulae D, D-1, D-2, D-3, D-4, D-5, D-6, and D-7 may include compounds of formula D-9, which are compounds of formula D, D-1, D-2, D-3, D-4, D-5, D-6, or D-7 wherein $R^{43}$ and $R^{44}$ are independently $C_1$-$C_6$ alkyl (e.g., methyl or ethyl) or siloxy (e.g., trimethylsiloxy), and $R^{45}$, $R^{46}$, and $R^{47}$ are independently $C_1$-$C_6$ alkyl (e.g., methyl, ethyl, n-propyl, or n-butyl).

Formula E.

The silicone-containing component for use in the invention may comprise a multi-functional silicone-containing component. Thus, for example, the silicone-containing component of formula A may comprise a bifunctional material of formula E:

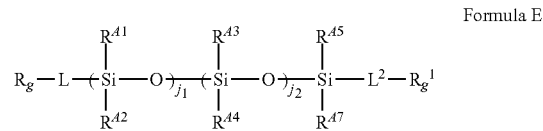

Formula E wherein

Rg, L, j1, j2, $R^{41}$, $R^{42}$, $R^{43}$, $R^{44}$, $R^{45}$, and $R^{47}$ are as defined above for formula B or its various sub-formulae (e.g., B-1, B-2, etc.);

$L^2$ is a linking group; and $Rg^1$ is a polymerizable group.

E-1.

Compounds of formula E may include compounds of formula E-1, which are compounds of formula E wherein Rg and $Rg^1$ are each a vinyl carbonate of structure $CH_2$=CH—O—C(=O)—O— or structure $CH_2$=$C(CH_3)$—O—C(=O)—O—.

E-2.

Compounds of formula E may include compounds of formula E-2, which are compounds of formula E wherein Rg and $Rg^1$ are each (meth)acrylate.

E-3.

Compounds of formula E may include compounds of formula E-3, which are compounds of formula E wherein Rg and $Rg^1$ are each (meth)acrylamide, wherein the nitrogen group may be substituted with $R^{49}$ (wherein $R^{49}$ is as defined above).

E-4.

Suitable compounds of formulae E, E-1, E-2, and E-3 include compounds of formula E-4, which are compounds of formula E, E-1, E-2, or E-3 wherein j1 is zero and j2 is from 1 to 220, or j2 is from 1 to 100, or j2 is from 1 to 50, or j2 is from 1 to 20.

E-5.

Suitable compounds of formulae E, E-1, E-2, and E-3 include compounds of formula E-5, which are compounds of formula E, E-1, E-2, or E-3, wherein j1 and j2 are independently from 4 to 100.

E-6.

Suitable compounds of formulae E, E-1, E-2, E-3, E-4, and E-5 include compounds of formula E-6, which are compounds of formula E, E-1, E-2, E-3, E-4, or E-5 wherein $R^{41}$, $R^{42}$, $R^{43}$, $R^{44}$, and $R^{45}$ are independently at each occurrence $C_1$-$C_6$ alkyl, preferably they are independently $C_1$-$C_3$ alkyl, or preferably, each is methyl.

E-7.

Suitable compounds of formulae E, E-1, E-2, E-3, E-4, E-5, and E-6 include compounds of formula E-7, which are compounds of formula E, E-1, E-2, E-3, E-4, E-5, or E-6 wherein $R^{47}$ is alkoxy-alkyleneoxy-alkyl, preferably it is a methoxy capped polyethyleneoxyalkyl of formula $CH_3O$—$[CH_2CH_2O]_p$—$CH_2CH_2CH_2$, wherein p is a whole number from 1 to 50, or from 1 to 30, or from 1 to 10, or from 6 to 10.

E-8.

Suitable compounds of formulae E, E-1, E-2, E-3, E-4, E-5, E-6, and E-7 include compounds of formula E-8, which are compounds of formula E, E-1, E-2, E-3, E-4, E-5, E-6, or E-7 wherein L comprises alkylene, carbamate, siloxanyl, cycloalkylene, amide, haloalkyleneoxy, oxaalkylene, or combinations of two or more thereof, wherein the linking group is optionally substituted with one or more substituents independently selected from alkyl, hydroxyl, ether, amine, carbonyl, and carbamate.

E-9.

Suitable compounds of formulae E, E-1, E-2, E-3, E-4, E-5, E-6, E-7, and E-8 include compounds of formula E-9, which are compounds of formula E, E-1, E-2, E-3, E-4, E-5, E-6, E-7, or E-8 wherein $L^2$ comprises alkylene, carbamate, siloxanyl, cycloalkylene, amide, haloalkyleneoxy, oxaalkylene, or combinations of two or more thereof, wherein the linking group is optionally substituted with one or more substituents independently selected from alkyl, hydroxyl, ether, amine, carbonyl, and carbamate.

Examples of silicone-containing components suitable for use in the invention include, but are not limited to, compounds listed in Table 1. Where the compounds in Table 1 contain polysiloxane groups, the number of SiO repeat units in such compounds, unless otherwise indicated, is preferably from 3 to 100, more preferably from 3 to 40, or still more preferably from 3 to 20.

TABLE 1

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SiMAA) |
| 16 | 2-hydroxy-3-methacryloxypropyloxypropyl-tris(trimethylsiloxy)silane |
| 17 | mono-(2-hydroxy-3-methacryloxypropyl)-propyl ether terminated mono-n-butyl terminated polydimethylsiloxanes (OH-mPDMS) (containing from 4 to 30, or from 10 to 20, or from 4 to 8 SiO repeat units) |
| 18 | 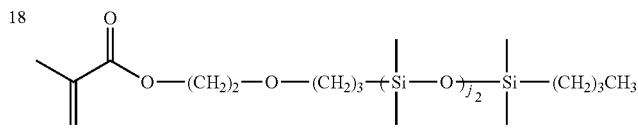 |
| 19 | 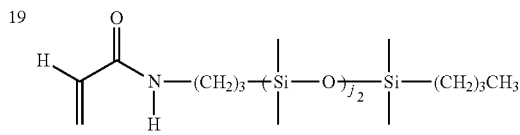 |
| 20 | 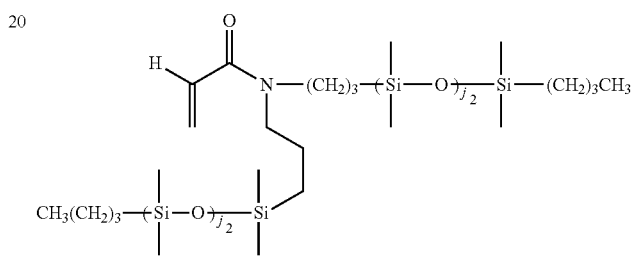 |

TABLE 1-continued

21 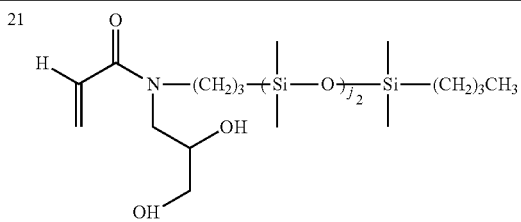

22 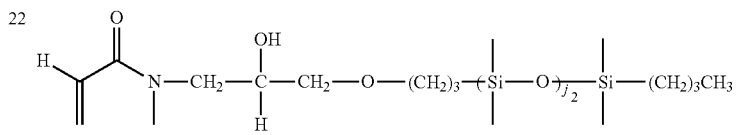

23 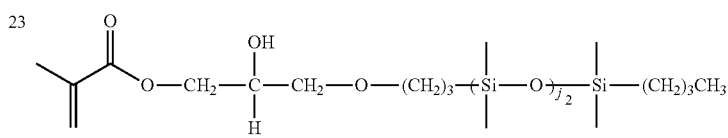

24 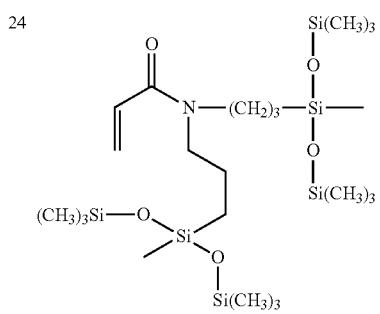

Additional non-limiting examples of suitable silicone-containing components are listed in Table 2. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE 2

25 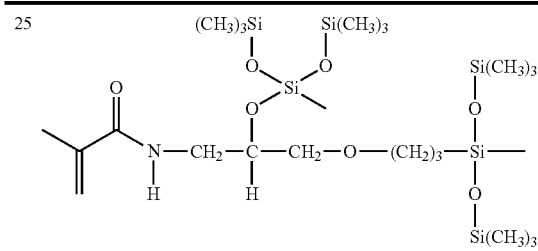

26 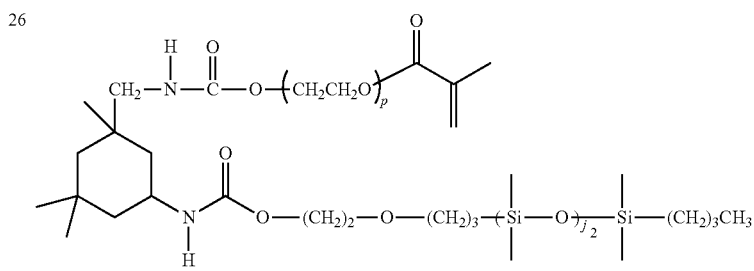

p is 1 to 10

TABLE 2-continued
27
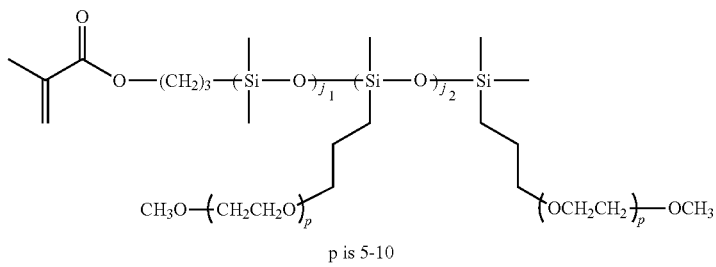
p is 5-10
28
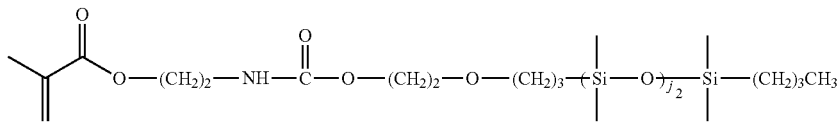
29
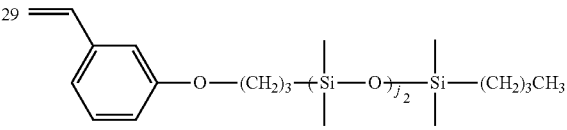
30  1,3-bis[4-(vinyloxycarbonyloxy)but-1-yl]tetramethyl-disiloxane
31  3-(vinyloxycarbonylthio) propyl-[tris (trimethylsiloxy)silane]
32  3-[tris(trimethylsiloxy)silyl]propyl allyl carbamate
33  3-[tris(trimethylsiloxy)silyl]propyl vinyl carbamate
34  tris(trimethylsiloxy)silylstyrene (Styryl-TRIS)
35
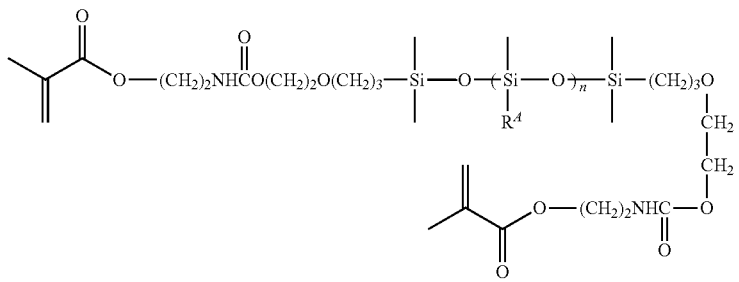
$R^A$ = $CH_3$ (a) or $CH_2CH_2CF_3$ (b) or $CH_2$—$(CH_2)_2$—$[OCH_2CH_2]_{1-10}$—$OCH_3$ (c); a + b + c = n
36
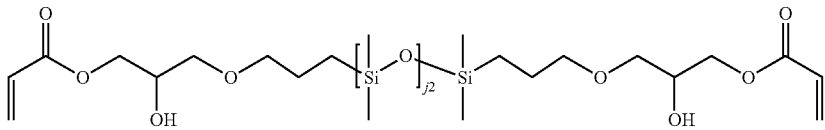
37
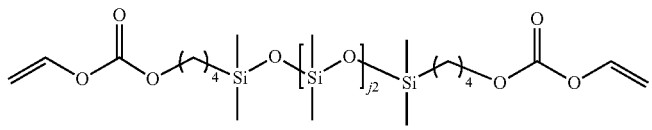
38
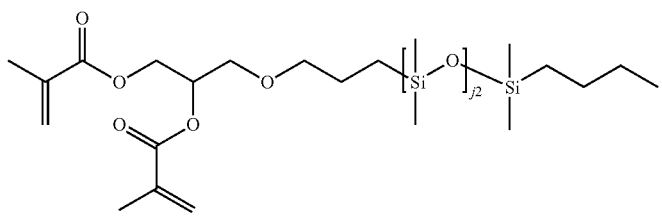

TABLE 2-continued

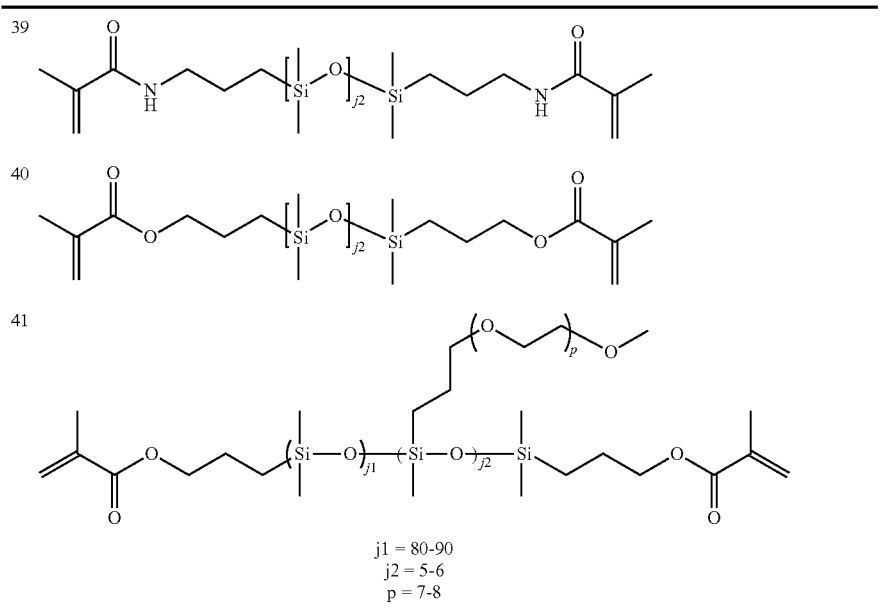

j1 = 80-90
j2 = 5-6
p = 7-8

The ethylenically unsaturated compound for inclusion in the first reactive composition and/or the grafting composition may comprise an independently selected hydrophilic component. Hydrophilic components include those which are capable of providing at least about 20% or at least about 25% water content to the resulting composition when combined with the remaining reactive components. Suitable hydrophilic components include hydrophilic monomers, prepolymers and polymers. Preferably, the hydrophilic component has at least one polymerizable group and at least one hydrophilic functional group. Examples of polymerizable groups include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds.

The term "vinyl-type" or "vinyl-containing" monomers refer to monomers containing the vinyl grouping (—CH=CH$_2$) and are generally highly reactive. Such hydrophilic vinyl-containing monomers are known to polymerize relatively easily.

"Acrylic-type" or "acrylic-containing" monomers are those monomers containing an acrylic group (CH$_2$=CRCOX) wherein R is H or CH$_3$, and X is O or N, which are also known to polymerize readily, such as N,N-dimethyl acrylamide (DMA), 2-hydroxyethyl methacrylamide, polyethyleneglycol monomethacrylate, methacrylic acid, acrylic acid, mixtures thereof and the like.

Hydrophilic monomers with at least one hydroxyl group (hydroxyalkyl monomer) may be used. The hydroxyl alkyl group may be selected from C$_2$-C$_4$ mono or dihydroxy substituted alkyl, and poly(ethylene glycol) having 1-10 repeating units; or is selected from 2-hydroxyethyl, 2,3-dihydroxypropyl, or 2-hydroxypropyl, and combinations thereof.

Examples of hydroxyalkyl monomers include 2-hydroxyethyl (meth)acrylate, 3-hydroxypropyl (meth)acrylate, 2-hydroxypropyl (meth)acrylate, 2,3-dihydroxypropyl (meth)acrylate, 2-hydroxybutyl (meth)acrylate, 3-hydroxybutyl (meth)acrylate, 1-hydroxypropyl 2-(meth)acrylate, 2-hydroxy-2-methyl-propyl (meth)acrylate, 3-hydroxy-2,2-dim-ethyl-propyl (meth)acrylate, 4-hydroxybutyl (meth)acrylate, 2-hydroxyethyl (meth)acrylamide, N-(2-hydroxypropyl) (meth)acrylamide, N,N-bis(2-hydroxyethyl) (meth)acrylamide, N,N-bis(2-hydroxypropyl) (meth)acrylamide, N-(3-hydroxypropyl) (meth)acrylamide, 2,3-dihydroxypropyl (meth)acrylamide, glycerol (meth)acrylate, polyethyleneglycol monomethacrylate, and mixtures thereof.

The hydroxyalkyl monomer may also be selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

The hydroxyalkyl monomer may comprise 2-hydroxyethyl methacrylate, 3-hydroxy-2,2-dimethyl-propyl methacrylate, hydroxybutyl methacrylate or glycerol methacrylate.

When hydrophilic polymers in quantities great than about 3 wt % are desired, hydroxyl containing (meth)acrylamides are generally too hydrophilic to be included as compatibilizing hydroxyalkyl monomers, and hydroxyl containing (meth)acrylates may be included in the reactive composition and the lower amount of hydroxyalkyl monomers may be selected to provide a haze value to the final lens of less than about 50% or less than about 30%.

It will be appreciated that the amount of hydroxyl component will vary depending upon a number of factors, including, the number of hydroxyl groups on the hydroxyalkyl monomer, the amount, molecular weight and presence of hydrophilic functionality on the silicone containing components. The hydrophilic hydroxyl component may be present in the reactive composition in amounts up to about 15%, up to about 10 wt %, between about 3 and about 15 wt % or about 5 and about 15 wt %.

Hydrophilic vinyl-containing monomers which may be incorporated into the polymer compositions include monomers such as hydrophilic N-vinyl lactam and N-vinyl amide monomers including: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-carboxyvinyl-β-alanine (VINAL), N-carboxyvinyl-a-alanine, N-vinylimidazole, and mixtures thereof.

Hydrophilic O-vinyl carbamates and O-vinyl carbonates monomers that may be used in the invention include: N-2-hydroxyethyl vinyl carbamate and N-carboxy-1-alanine N-vinyl ester. Further examples of the hydrophilic vinyl carbonate or vinyl carbamate monomers are disclosed in U.S. Pat. No. 5,070,215, and the hydrophilic oxazolone monomers are disclosed in U.S. Pat. No. 4,910,277.

Examples of vinyl carbamates and carbonates that may be used include: N-2-hydroxyethyl vinyl carbamate, N-carboxy-1-alanine N-vinyl ester, other hydrophilic vinyl monomers, including vinylimidazole, ethylene glycol vinyl ether (EGVE), di(ethylene glycol) vinyl ether (DEGVE), allyl alcohol, 2-ethyl oxazoline, vinyl acetate, acrylonitrile, and mixtures thereof.

(Meth)acrylamide monomers may also be used as hydrophilic monomers. Examples include N-N-dimethylacrylamide, acrylamide, N,N-bis(2-hydroxyethyl)acrylamide, acrylonitrile, N-isopropyl acrylamide, N,N-dimethylaminopropyl(meth)acrylamide, and any of the hydroxyl functional (meth)acrylamides listed above.

The hydrophilic monomers which may be incorporated into the polymers disclosed herein may be selected from N,N-dimethyl acrylamide (DMA), 2-hydroxyethyl acrylamide, 2-hydroxyethyl methacrylamide, N-hydroxypropyl methacrylamide, bishydroxyethyl acrylamide, 2,3-dihydroxypropyl (meth)acrylamide, N-vinylpyrrolidone (NVP), N-vinyl-N-methyl acetamide, N-vinyl methacetamide (VMA), and polyethyleneglycol monomethacrylate.

The hydrophilic monomers may be selected from DMA, NVP, VMA, NVA, and mixtures thereof.

The hydrophilic monomers may be macromers of linear or branched poly(ethylene glycol), poly(propylene glycol), or statistically random or block copolymers of ethylene oxide and propylene oxide. The macromer of these polyethers has one polymerizable group. Non-limiting examples of such polymerizable groups are acrylates, methacrylates, styrenes, vinyl ethers, acrylamides, methacrylamides, and other vinyl compounds. The macromer of these polyethers may comprise acrylates, methacrylates, acrylamides, methacrylamides, and mixtures thereof. Other suitable hydrophilic monomers will be apparent to one skilled in the art.

The hydrophilic monomers may also comprise charged monomers including but not limited to acrylic acid, methacrylic acid, 3-acrylamidopropionic acid (ACA1), 4-acrylamidobutanoic acid, 5-acrylamidopentanoic acid (ACA2), 3-acrylamido-3-methylbutanoic acid (AMBA), N-vinyloxycarbonyl-α-alanine, N-vinyloxycarbonyl-β-alanine (VINAL), 2-vinyl-4,4-dimethyl-2-oxazolin-5-one (VDMO), reactive sulfonate salts, including, sodium-2-(acrylamido)-2-methylpropane sulphonate (AMPS), 3-sulphopropyl (meth)acrylate potassium salt, 3-sulphopropyl (meth)acrylate sodium salt, bis 3-sulphopropyl itaconate di sodium, bis 3-sulphopropyl itaconate di potassium, vinyl sulphonate sodium salt, vinyl sulphonate salt, styrene sulfonate, sulfoethyl methacrylate, combinations thereof and the like.

The hydrophilic monomers may be selected from N,N-dimethyl acrylamide (DMA), N-vinylpyrrolidone (NVP), 2-hydroxyethyl methacrylate (HEMA), N-vinyl methacetamide (VMA), and N-vinyl N-methyl acetamide (NVA), N-hydroxypropyl methacrylamide, mono-glycerol methacrylate, 2-hydroxyethyl acrylamide, 2-hydroxyethyl methacrylamide, bishydroxyethyl acrylamide, 2,3-dihydroxypropyl (meth)acrylamide and mixtures thereof.

The hydrophilic monomers may be selected from DMA, NVP, HEMA, VMA, NVA, and mixtures thereof.

The hydrophilic monomer(s) (including the hydroxyl alkyl monomers) may be present in amounts up to about 60 wt %, from about 1 to about 60 weight %, from about 5 to about 50 weight %, or from about 5 to about 40 weight %, based upon the weight of all reactive components.

Other hydrophilic monomers that can be employed include polyoxyethylene polyols having one or more of the terminal hydroxyl groups replaced with a polymerizable group. Examples include polyethylene glycol with one or more of the terminal hydroxyl groups replaced with a polymerizable group. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

Hydrophilic monomers which may be incorporated into the polymer compositions disclosed herein include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), N-vinyl methacrylamide, HEMA, and poly(ethyleneglycol) methyl ether methacrylate (mPEG).

Hydrophilic monomers may include DMA, NVP, HEMA and mixtures thereof.

The first reactive composition and/or the grafting composition may contain one or more independently selected ethylenically unsaturated zwitterionic compounds, such as an ethylenically unsaturated betaine. Preferably, the zwitterionic compound is in the grafting composition. Examples of suitable compounds include: N-(2-carboxyethyl)-N,N-dimethyl-3-[(1-oxo-2-propen-1-yl)amino]-1-propanaminium, inner salt (CAS 79704-35-1, also known as 3-acrylamido-N-(2-carb oxyethyl)-N,N-dimethylpropane-1-aminium or CBT); 3-methacrylamido-N-(2-carboxyethyl)-N,N-dimethylpropane-1-aminium; N,N-dimethyl-N-[3-[(1-oxo-2-propen-1-yl)amino]propyl]-3-sulfo-1-propanaminium, inner salt (CAS 80293-60-3, also known as 3-((3-acrylamidopropyl) dimethylammonio) propane-1-sulfonate or SBT); 3-((3-methacrylamidopropyl) dimethylammonio) propane-1-sulfonate; 3,5-Dioxa-8-aza-4-phosphaundec-10-en-1-aminium, 4-hydroxy-N,N,N-trimethyl-9-oxo, inner salt, 4-oxide (CAS 163674-35-9, "PBT"); 2-(acrylamidoethoxy)-(2-(trimethylammonio)ethyl) phosphate; 2-(methacrylamidoethoxy)-(2-(trimethylammonio)ethyl) phosphate; 4-hydroxy-N,N,N, 10-tetramethyl-9-oxo-3,5,8-trioxa-4-phosphaundec-10-en-1-aminium inner salt, 4-oxide (CAS 67881-98-5, also known as 2-(methacryloyloxy)ethyl (2-(trimethylammonio)ethyl) phosphate or MPC); or 2-(acryloyloxy)ethyl (2-(trimethylammonio)ethyl) phosphate.

The first reactive composition and/or the grafting composition may contain one or more independently selected ethylenically unsaturated quaternary ammonium salts. Preferably, the quaternary ammonium salt is in the grafting composition. Examples of suitable compounds include 2-(methacryloyloxy)ethyl trimethylammonium chloride; 2-(acryloyloxy)ethyl trimethylammonium chloride; 3-methacrylamido-N,N,N-trimethylpropan-1-aminium chloride; or 3-acrylamido-N,N,N-trimethylpropan-1-aminium chloride The first reactive composition and/or the grafting composition may contain one or more independently selected ethylenically unsaturated active pharmaceutical ingredients. Preferably, the active pharmaceutical compound is in the grafting composition. Examples of suitable compounds include cyclosporine or salicylate monomers.

The first reactive composition and/or the grafting composition may contain one or more independently selected ethylenically unsaturated peptides. Preferably, the peptide is in the grafting composition. Exemplary compounds include, for instance, those wherein the amino-terminus of a peptide may be acylated with an acylating agent such as (meth)acryloyl chloride, (meth)acrylic anhydride, isopropenyl α,α-dimethylbenzyl isocyanate and 2-isocyanatoethyl methacrylate along with known co-reagents and catalysts to form a monomer suitable for incorporation into reactive compositions of the present inventions The first reactive composition of the invention contains a crosslinker. Crosslinkers may optionally be present in the grafting composition. A variety of crosslinkers may be used, including silicone-containing and non-silicone containing cross-linking agents, and mixtures thereof. Examples of suitable crosslinkers include ethylene glycol dimethacrylate (EGDMA), diethyleneglycol dimethacrylate, trimethylolpropane trimethacrylate (TMPTMA), tetraethylene glycol dimethacrylate (TEGDMA), triallyl cyanurate (TAC), glycerol trimethacrylate, 1,3-propanediol dimethacrylate; 2,3-propanediol dimethacrylate; 1,6-hexanediol dimethacrylate; 1,4-butanediol dimethacrylate, methacryloxyethyl vinylcarbonate (HEMAVc), allylmethacrylate, methylene bisacrylamide (MBA), polyethylene glycol dimethacrylate (wherein the polyethylene glycol preferably has a molecular weight up to 5,000 Daltons). The crosslinkers are used in the typical amounts known to those skilled in the art, e.g., from about 0.000415 to about 0.0156 mole per 100 grams of reactive components in the reaction composition.

It should be noted that if the ethylenically unsaturated compound, such as a hydrophilic monomer or a silicone containing monomer, acts as the crosslinker, for instance by virtue of being bifunctional or multifunctional, the addition of a separate crosslinker to the reaction composition is optional. In this case, the ethylenically unsaturated compound is also considered a crosslinker. Examples of hydrophilic monomers which can act as the crosslinking agent and when present do not require the addition of an additional crosslinking agent to the reaction composition include polyoxyethylene polyols described above containing two or more terminal methacrylate moieties. An example of a silicone containing monomer which can act as a crosslinking agent and, when present, does not require the addition of a crosslinking monomer to the reaction composition includes α, ω-bismethacryloypropyl polydimethylsiloxane. In addition, any of the above disclosed multifunctional silicone-containing components may be used as cross-linking agents.

Either or both of the first reactive composition and the grafting composition may contain additional components such as, but not limited to, UV absorbers, photochromic compounds, pharmaceutical and nutraceutical compounds, antimicrobial compounds, reactive tints, pigments, copolymerizable and non-polymerizable dyes, release agents and combinations thereof. Other components that can be present in the first and/or grafting compositions include wetting agents, such as those disclosed in U.S. Pat. No. 6,367,929, WO03/22321, WO03/22322, compatibilizing components, such as those disclosed in US2003/162862 and US2003/125498. The sum of additional components may be up to about 20 wt %. The reactive compositions may comprise up to about 18 wt % wetting agent, or from about 5 and about 18 wt % wetting agent.

As used herein, wetting agents are hydrophilic polymers having a weight average molecular weight greater than about 5,000 Daltons, between about 150,000 Daltons to about 2,000,000 Daltons; between about 300,000 Daltons to about 1,800,000 Daltons; or between about 500,000 Daltons to about 1,500,000 Daltons.

The amount of optional wetting agent which may be added to the first reactive composition and/or the grafting composition of the present invention may be varied depending on the other components used and the desired properties of the resulting product. When present, the internal wetting agents in reactive compositions may be included in amounts from about 1 weight percent to about 20 weight percent; from about 2 weight percent to about 15 percent, or from about 2 to about 12 percent, all based upon the total weight of all of the reactive components. Preferably, a wetting agent, when used, is present in the first reactive composition.

Wetting agents include but are not limited to homopolymers, statistically random copolymers, diblock copolymers, triblock copolymers, segmented block copolymers, graft copolymers, and mixtures thereof. Non-limiting examples of internal wetting agents are polyamides, polyesters, polylactones, polyimides, polylactams, polyethers, polyacids homopolymers and copolymers prepared by the free radical polymerization of suitable monomers including acrylates, methacrylates, styrenes, vinyl ethers, acrylamides, methacrylamides, N-vinyllactams, N-vinylamides, O-vinylcarbamates, O-vinylcarbonates, and other vinyl compounds. The wetting agents may be made from any hydrophilic monomer, including those listed herein.

The wetting agents may include acyclic polyamides that comprise pendant acyclic amide groups and are capable of association with hydroxyl groups. Cyclic polyamides comprise cyclic amide groups and are also capable of association with hydroxyl groups.

Examples of suitable acyclic polyamides include polymers and copolymers comprising repeating units of Formula XXIX or Formula XXX:

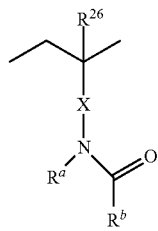

Formula XIX

-continued

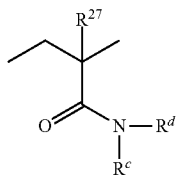

Formula XXX wherein X is a direct bond, —(CO)—, or —(CO)—NHR$^e$—, wherein R$^{26}$ and R$^{27}$ are H or methyl groups; wherein R$^e$ is a C$_1$ to C$_3$ alkyl group; R$^a$ is selected from H, straight or branched, substituted or unsubstituted C$_1$ to C$_4$ alkyl groups; R$^b$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$^c$ is selected from H, straight or branched, substituted or unsubstituted C$_1$ to C$_4$ alkyl groups, or methyl, ethoxy, hydroxyethyl, and hydroxymethyl; R$^d$ is selected from H, straight or branched, substituted or unsubstituted C$_1$ to C$_4$ alkyl groups; or methyl, ethoxy, hydroxyethyl, and hydroxymethyl wherein the number of carbon atoms in R$^a$ and R$^b$ taken together is 8 or less, including 7, 6, 5, 4, 3, or less, and wherein the number of carbon atoms in R$^c$ and R$^d$ taken together is 8 or less, including 7, 6, 5, 4, 3, or less. The number of carbon atoms in R$^a$ and R$^b$ taken together may be 6 or less or 4 or less. The number of carbon atoms in R$^c$ and R$^d$ taken together may be 6 or less. As used herein substituted alkyl groups include alkyl groups substituted with an amine, amide, ether, hydroxyl, carbonyl, carboxy groups or combinations thereof.

R$^a$ and R$^b$ can be independently selected from H, substituted or unsubstituted C$_1$ to C$_2$ alkyl groups. X may be a direct bond, and R$^a$ and R$^b$ may be independently selected from H, substituted or unsubstituted C$_1$ to C$_2$ alkyl groups.

R$^c$ and R$^d$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating unit of Formula XXIX or Formula XXX, or the acyclic polyamides can comprise at least about 50 mole % of the repeating unit of Formula XXIX or Formula XXX, including at least about 70 mole %, and at least 80 mole %.

Specific examples of repeating units of Formula XXIX or Formula XXX include repeating units derived from N-vinyl-N-methylacetamide, N-vinylacetamide, N-vinyl-N-methyl-propionamide, N-vinyl-N-methyl-2-methylpropionamide, N-vinyl-2-methylpropionamide, N-vinyl-N,N'-dimethyl-urea, N,N-dimethylacrylamide, methacrylamide and acyclic amides of Formulae XXXI and XXXII:

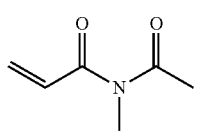

Formula XXXI

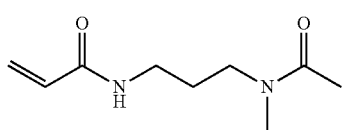

Formula XXXII

Examples of suitable cyclic amides that can be used to form the cyclic polyamides include α-lactam, β-lactam, γ-lactam, δ-lactam, and ε-lactam. Examples of suitable cyclic polyamides include polymers and copolymers comprising repeating units of Formula XXXIII:

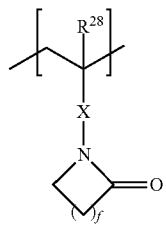

Formula XXXIII wherein f is a number from 1 to 10, X is a direct bond, —(CO)—, or —(CO)—NH—R$^e$—, wherein R$^e$ is a C$_1$ to C$_3$ alkyl group and R$^{28}$ is a hydrogen atom or methyl group. In Formula XXXIII, f may be 8 or less, including 7, 6, 5, 4, 3, 2, or 1. In Formula XXXIII, f may be 6 or less, including 5, 4, 3, 2, or 1, or may be from 2 to 8, including 2, 3, 4, 5, 6, 7, or 8, or may be 2 or 3.

When X is a direct bond, f may be 2. In such instances, the cyclic polyamide may be polyvinylpyrrolidone (PVP).

The cyclic polyamides may comprise 50 mole % or more of the repeating unit of Formula XXXIII, or the cyclic polyamides can comprise at least about 50 mole % of the repeating unit of Formula XXXIII, including at least about 70 mole %, and at least about 80 mole %.

Specific examples of repeating units of Formula XXXIII include repeating units derived from N-vinylpyrrolidone, which forms PVP homopolymers and vinylpyrrolidone copolymers or N-vinylpyrrolidone substituted with hydrophilic substituents such as phosphoryl choline.

The polyamides may also be copolymers comprising cyclic amide, acyclic amide repeating units or copolymers comprising both cyclic and acyclic amide repeating units.

Additional repeating units may be formed from monomers selected from hydroxyalkyl(meth)acrylates, alkyl (meth)acrylates or other hydrophilic monomers and siloxane substituted acrylates or methacrylates. Any of the monomers listed as suitable hydrophilic monomers may be used as comonomers to form the additional repeating units. Specific examples of additional monomers which may be used to form polyamides include 2-hydroxyethylmethacrylate, vinyl acetate, acrylonitrile, hydroxypropyl methacrylate, 2-hydroxyethyl acrylate, methyl methacrylate and hydroxybutyl methacrylate, GMMA, PEGS, and the like and mixtures thereof. Ionic monomers may also be included. Examples of ionic monomers include acrylic acid, methacrylic acid, 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl) dimethylammonio)propane-1-sulfonate (MAPDAPS).

The reactive composition may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

The wetting agents may be made from DMA, NVP, HEMA, VMA, NVA, and combinations thereof. The wetting agents may also be reactive components, as defined herein, by having polymerizable groups, for example, made by the acylation reaction between pendant hydroxyl groups on HEMA repeating units of an internal wetting agent and methacryloyl chloride or methacryloyl anhydride. Other methods of functionalization will be apparent to one skilled in the art.

Such internal wetting agents are disclosed in U.S. Pat. Nos. 6,367,929, 6,822,016, 7,052,131, 7,666,921, 7,691,916, 7,786,185, 8,022,158, and 8,450,387.

Generally, the reactive components within a reactive composition may be dispersed or dissolved in a diluent. Suitable diluents are known in the art or can be easily determined by a person of ordinary skill in the art. For example, when silicone hydrogels are being prepared, suitable diluents are disclosed in WO 03/022321 and U.S. Pat. No. 6,020,445 the disclosures of which are incorporated herein by reference.

Classes of suitable diluents for silicone hydrogel reaction mixtures include alcohols having 2 to 20 carbons, amides having 10 to 20 carbon atoms derived from primary amines and carboxylic acids having 8 to 20 carbon atoms. Primary and tertiary alcohols are preferred. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Suitable diluents for non-silicone containing reaction compositions include glycerin, ethylene glycol, ethanol, methanol, ethyl acetate, methylene chloride, polyethylene glycol, polypropylene glycol, low number average molecular weight polyvinylpyrrolidone (PVP), such as disclosed in U.S. Pat. Nos. 4,018,853, 4,680,336 and 5,039,459, including, but not limited to boric acid esters of dihydric alcohols, combinations thereof and the like.

Mixtures of diluents may be used. The diluents may be used in amounts up to about 55% by weight of the total of all components in the reactive composition. More preferably the diluent is used in amounts less than about 45% and more preferably in amounts between about 15 and about 40% by weight of the total of all components in the reactive composition.

In a preferred aspect, the crosslinked substrate network of the invention may be a silicone hydrogel (containing covalently bound activatable free radical initiators such as MAPO groups) and the grafting composition may provide, following polymerization, a hydrophilic grafted material (which may optionally be charged), for instance comprising poly(N,N-dimethylacrylamide) (PDMA), polymerized polyethylene glycol mono-methacrylate (e.g., having number average molecular weight from about 300 to about 1000) (poly(mPEG)), a copolymer of 2-hydroxyethyl methacrylate and methacrylic acid, 2-(methacryloyloxy)ethyl (2-(trimethylammonio)ethyl) phosphate (MPC). Such grafted polymer networks may exhibit improved biocompatibility and biometrics when used in ophthalmic devices.

The crosslinked substrate network may be a conventional hydrogel (e.g., comprising a copolymer of 2-hydroxyethyl methacrylate and methacrylic acid and containing MAPO groups) and the grafting composition provides, following polymerization, a hydrophilic grafted material (which may optionally be charged), such as a polyamide. Examples include PDMA, polyvinylpyrrolidone (PVP), poly(N-vinyl N-methyl acetamide) (PVMA), and copolymers thereof. Such grafted polymer networks may exhibit improved biocompatibility and biometrics, for instance when used in ophthalmic devices.

The crosslinked substrate network may be a conventional hydrogel (e.g., a copolymer of 2-hydroxyethyl methacrylate and methacrylic acid and containing MAPO groups) and the grafting composition provides, following polymerization, a hydrophobic siloxane containing material. Such grafted polymeric networks may exhibit desirable physical and mechanical properties, such as oxygen gas permeability (Dk) and modulus, as well as improved biocompatibility and handling.

For ophthalmic devices, such as contact lenses, that contain one or more silicone containing component, the silicone-containing component(s) may preferably be present in amounts up to about 95 weight %, or from about 10 to about 80, or from about 20 to about 70 weight %, based upon all reactive components present, including in the first reactive composition and the reactive second composition. Suitable hydrophilic components may preferably be present in amounts from about 10 to about 60 weight %, or from about 15 to about 50 weight %, or from about 20 to about 40 weight %, based upon all reactive components present, including in the first reactive composition and the grafting composition.

It should be noted that additional, optional, steps may be included in the process for making the polymer compositions of the invention. For instance, following step (b), an ink or dye may be added to the crosslinked substrate network. Then, the remaining steps (step (c) etc.) may be carried out. This allows for an ink or dye to be sandwiched within the grafted polymeric network.

For ophthalmic devices, such as contact lenses, the crosslinked substrate network is preferably a silicone hydrogel with a balance of properties that makes them desirable. These properties include water content, haze, contact angle, modulus, oxygen permeability, lipid uptake, lysozyme uptake and PQ1 uptake. Examples of preferred properties are as follows. All values are prefaced by "about," and the ophthalmic devices may have any combination of the listed properties:

Water content: at least 20%, or at least 25%

Haze: 30% or less, or 10% or less

Dynamic contact angle (DCA (°)): 100° or less, or 50° or less

Modulus (psi): 120 or less, or 80 to 120

Oxygen permeability (Dk (barrers)): at least 80, or at least 100, or at least 150, or at least 200

Elongation to Break: at least 100

For ionic silicon hydrogels, the following properties may also be preferred (in addition to those recited above):

Lysozyme uptake (g/lens): at least 100, or at least 150, or at least 500, or at least 700

Polyquaternium-1 (PQ1) uptake (%): 15 or less, or 10 or less, or 5 or less

Finished ophthalmic devices may be manufactured by various techniques. For instance, in the case of hydrogel contact lenses, the first reactive composition described above may be cured in a mold, or formed via spincasting or static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the hydrogels, which is economical, and enables precise control over the final shape of the hydrated contact lens. For this method, the first reactive composition is placed in a mold having the desired shape and the reactive composition is subjected to conditions as described above whereby the reactive components polymerize to produce the crosslinked substrate network in the approximate shape of the final desired product.

The crosslinked substrate network formed after such curing may be subjected to extraction to remove unreacted components and release the crosslinked substrate network from the contact lens mold. The crosslinked substrate network may then be immersed in the grafting composition (which may optionally contain a diluent), and sufficient time is allowed to permit at the reactive composition to diffuse into the crosslinked substrate network to the desired level. Thereafter, the suspension is irradiated as described above to form the grafted product, and the contact lenses may then be extracted to remove unreacted components.

Extractions of the crosslinked substrate network and the contact lens may be done using conventional extraction fluids, such organic solvents, such as alcohols or may be extracted using aqueous solutions. Aqueous solutions are solutions which comprise water. The aqueous solutions may comprise at least about 30 weight % water, or at least about 50 weight % water, or at least about 70% water or at least about 90 weight % water.

Extraction may be accomplished, for example, via immersion of the crosslinked substrate network or the contact lens in an aqueous solution or exposing the material to a flow of an aqueous solution. Extraction may also include, for example, one or more of: heating the aqueous solution; stirring the aqueous solution; increasing the level of release aid in the aqueous solution to a level sufficient to cause release of the crosslinked substrate network from the mold; mechanical or ultrasonic agitation; and incorporating at least one leach aid in the aqueous solution to a level sufficient to facilitate adequate removal of unreacted components from the crosslinked substrate network or the contact lens. The foregoing may be conducted in batch or continuous processes, with or without the addition of heat, agitation or both.

Some embodiments may also include the application of physical agitation to facilitate leach and release. For example, the crosslinked substrate network mold part to which the crosslinked substrate network is adhered may be vibrated or caused to move back and forth within an aqueous solution. Other embodiments may include ultrasonic waves through the aqueous solution.

Contact lenses may be sterilized by known means such as, but not limited to, autoclaving.

Some embodiments of the invention will now be described in detail in the following Examples.

EXAMPLES

The contact lens diameter (DM) was measured on a calibrated Van Keuren micro optical comparator equipment equipped with Mitutoyo digimatic micrometer heads. The contact lens was placed concave side down into a crystal cell completely filled with borate buffered packing solution. A cap was placed onto the cell ensuring that no air is trapped underneath. The cell was then placed on the comparator stage and the lens image brought into focus and aligned so that one edge of the lens touched the center line on the screen. The first edge was marked, the lens moved along its diameter until the second edge is touching the center line on the screen, and then, the second edge is marked by pushing the data button again. Typically, two diameter measurements are made and the average reported in the data tables.

Water content (WC) was measured gravimetrically. Lenses were equilibrated in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours, typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows: % water content=(wet weight−dry weight)/wet weight×100. The average and standard deviation of the water content were calculated and the average value reported as the percent water content of the test lens.

The grafted lens weight gain was calculated from the average dry weight of the grafted lens minus the average dry weight of the substrate lens and expressed as a percentage. Both the grafted lens and the substrate lens were equilibrated in deionized water for several hours to remove any residual salts. Typically, at least three lenses are weighed and averaged for each sample.

The refractive index (RI) of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (+/−0.2° C.). The prism assembly was opened and the test lens placed on the lower prism between the magnetic dots closest to the light source. If the prism is dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Oxygen permeability (Dk) was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm. The calculations for a 7.8 mm radius sensor and 10% (v/v) air flow are as follows:

$Dk/t=$(measured current−dark current)$\times(2.97\times10-8$ mL O2/(μ$A$-sec-cm2-mm Hg)

The edge correction was related to the Dk of the material. For all Dk values less than 90 barrers:

$t/Dk$(edge corrected)$=[1+(5.88\times t)]\times(t/Dk)$

For Dk values between 90 and 300 barrers:

$t/Dk$(edge corrected)$=[1+(3.56\times t)]\times(t/Dk)$

For Dk values greater than 300 barrers:

$t/Dk$(edge corrected)$=[1+(3.16\times t)]\times(t/Dk)$

Non-edge corrected Dk was calculated from the reciprocal of the slope obtained from the linear regression analysis of the data wherein the x variable was the center thickness in centimeters and the y variable was the t/Dk value. On the other hand, edge corrected Dk (EC Dk) was calculated from the reciprocal of the slope obtained from the linear regression analysis of the data wherein the x variable was the center thickness in centimeters and the y variable was the edge corrected t/Dk value. The resulting Dk value was reported in barrers.

Wettability of lenses was determined by a modified Wilhelmy plate method using a calibrated Kruss K100 tensiometer at room temperature (23±4° C.) and using surfactant free borate buffered saline as the probe solution. All equipment must be clean and dry; vibrations must be minimal around the instrument during testing. Wettability is usually reported as the advancing contact angle (Kruss DCA). The tensiometer was equipped with a humidity generator, and a temperature and humidity gage was placed in the tensiometer chamber. The relative humidity was maintained at 70±5%. The experiment was performed by dipping the lens specimen of known perimeter into the packing solution of known surface tension while measuring the force exerted on the sample due to wetting by a sensitive balance. The advancing contact angle of the packing solution on the lens is determined from the force data collected during sample dipping. The receding contact angle is determined from force data while withdrawing the sample from the liquid. The Wilhelmy plate method is based on the following formula: $Fg=\gamma\rho \cos \theta-B$, wherein F=the wetting force between the liquid and the lens (mg), g=gravitational acceleration (980.665 cm/sec$^2$), γ=surface tension of probe liquid (dyne/cm), ρ=the perimeter of the contact lens at the liquid/lens meniscus (cm), θ=the dynamic contact angle (degree), and B=buoyancy (mg). B is zero at the zero depth of immersion. Typically, a test strip was cut from the central area of the contact lens. Each strip was approximately 5 mm in width and 14 mm in length, attached to a metallic clip using plastic tweezers, pierced with a metallic wire hook, and equilibrated in packing solution for at least 3 hours. Then, each sample was cycled four times, and the results were averaged to obtain the advancing and receding contact angles of the lens. Typical measuring speeds were 12 mm/min. Samples were kept completely immersed in packing solution during the data acquisition and analysis without touching the metal clip. Values from five individual lenses were averaged to obtain the reported advancing and receding contact angles of the experimental lens.

Wettability of lenses was determined using a sessile drop technique using KRUSS DSA-100 TM instrument at room temperature and using deionized water as probe solution (Sessile Drop). The lenses to be tested were rinsed in deionized water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface. Typically, three to five lenses were evaluated and the average contact angle reported.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a −1.00 power lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample (Lo) and sample length at break (Lf) were measured. At least five specimens of each composition were measured, and the average values were used to calculate the percent elongation to break: percent elongation=[(Lf−Lo)/Lo]×100. The tensile modulus (M) was calculated as the slope of the initial linear portion of the stress-strain curve; the units of modulus are pounds per square inch or psi. The tensile strength (TS) was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in3. The elongation to break (ETB) was also recorded as the percent strain at break.

PQ1 uptake (PQ1) was measured chromatographically. The HPLC was calibrated using a series of standard PQ1 solutions having concentrations 2, 4, 6, 8, 12 and 15 µg/mL. Lenses were placed into polypropylene contact lens cases with 3 mL of Optifree Replenish or similar lens solution (PQ1 concentration=10 micrograms/mL) which is commercially available from Alcon. A control lens case, containing 3 mL of solution, but no contact lens was also prepared. The lenses and control solutions were stored at room temperature for 72 hours. 1 mL of solution was removed from each of the samples and controls and mixed with trifluoroacetic acid (10 µL). The analysis was conducted using HPLC/ELSD and a Phenomenex Luna C5 (4.6 mm×5 mm; 5 µm particle size) column with the following equipment and conditions: Agilent 1200 HPLC or equivalent with an ELSD operating at T=100° C., Gain=12, Pressure=4.4 bar, Filter=3 s; ELSD parameters may vary from instrument to instrument; using mobile phase A of water (0.1% TFA) and mobile phase B of acetonitrile (0.1% TFA), a column temperature of 40° C. and an injection volume of 100 µL. An elution profile was used and listed in Table A. A calibration curve was created by plotting the peak area value as a function of the concentration of the PQ1 standard solutions. The concentration of PQ1 in a sample was then calculated by solving the quadratic equation representing the calibration curve. Three lenses were run for each analysis, and the results were averaged. PQ1 uptake was reported as the percentage loss of PQ1 after soak with lens compared to the PQ1 present in the control without lens.

TABLE A

HPLC Elution Profile

| Time (minutes) | % A | % B | Flow Rate (mL/min) |
| --- | --- | --- | --- |
| 0.00 | 100 | 0 | 1.2 |
| 1.00 | 100 | 0 | 1.2 |
| 5.00 | 0 | 100 | 1.2 |
| 8.50 | 0 | 100 | 1.2 |
| 8.60 | 100 | 0 | 1.2 |
| 11.00 | 100 | 0 | 1.2 |

The amount of cholesterol absorbed by a contact lens was determined by a LC-MS method (lipids). Lenses were soaked in a cholesterol solution and then extracted with dichloromethane. The dichloromethane extract was evaporated and reconstituted with a heptane/isopropanol mixture with subsequent analysis by LC-MS. The results were reported as micrograms of cholesterol per lens. A deuterated cholesterol internal standard was used to improve accuracy and precision of the method. A cholesterol stock solution was prepared by placing 15.0±0.5 milligrams of cholesterol into a wide-mouth 10 mL glass volumetric flask followed by dilution with isopropanol.

A cholesterol soak solution was prepared by placing 0.430±0.010 grams of lysozyme (purity=93%), 0.200±0.010 grams of albumin, and 0.100±0.010 grams of β-lactoglobulin into a 200 mL glass volumetric flask, adding approximately 190 milliliters of PBS to the flask, and swirling to dissolve the contents. 2 Milliliters of the cholesterol stock solution was then added and diluted to volume with PBS. The volumetric flask was capped and shaken well. The concentration of the cholesterol soak solution was approximately 15 µg/mL. Note: The mass of these components may be adjusted to account for lot-to-lot purity variability so that the target concentrations can be achieved.

Six contact lenses were removed from their packages and blotted with lint-free paper towels to remove excess packing solution. The lenses were placed into six separate 8 mL glass vials (one lens per vial), and 3.0 mL of the cholesterol soak solution was added to each vial. The vials were capped and placed into a New Brunswick Scientific incubator-shaker for 72 hours at 37° C. and 100 rpm. After incubation, each lens was rinsed three times with PBS in 100 mL beakers and placed into a 20-mL scintillation vial.

To each lens-containing scintillation vial, 5 mL of dichloromethane and 100 µL of the internal standard solution were added. After a minimum of 16 hours of extraction time, the supernatant liquid was transferred into a 5 mL disposable glass culture tube. The tube was placed into the Turbovap and the solvent completely evaporated. Place 1 mL of the diluent into the culture tube and re-dissolve the contents. The aforementioned diluent was a 70:30 (v/v) mixture of heptane and isopropanol. The diluent was also the mobile phase. The resulting solution was carefully transferred into an autosampler vial and ready for LC-MS analysis.

An internal standard stock solution was prepared by weighing approximately 12.5+2 mg of deuterated cholesterol (2,2,3,4,4,6-$d_6$-cholesterol) in a 25 mL volumetric flask followed by dilution with the diluent. The concentration of the internal standard stock solution was approximately 500 µg/mL.

An internal standard solution was prepared by placing 1.0 mL of the internal standard stock solution in a 50 mL volumetric flask followed by dilution to volume with diluent. The concentration of this intermediate internal standard solution is approximately 10 µg/mL.

A reference standard stock solution was prepared by weighing approximately 50+5 mg of cholesterol in a 100 mL volumetric flask followed by dilution with diluent. The concentration of the cholesterol in this reference stock solution is approximately 500 µg/mL. Working standard solutions were then made according to Table B by placing the appropriate amount of standard solutions into the listed 25 mL, 50 mL or 100 mL volumetric flasks. After the standard solutions were added to the volumetric flasks, the mixture was diluted to volume with diluent and swirled well.

TABLE B

Working Standard Solution Formulations

| Working Standard Name | Volume of Internal Standard Solution (mL) | Volume of Reference Standard Stock Solution (µL) | Final Volume (mL) | Approximate Cholesterol Concentration (µg/mL) |
| --- | --- | --- | --- | --- |
| Std 1 | 10 | 20 | 100 | 0.10 |
| Std 2 | 5 | 25 | 50 | 0.25 |
| Std 3 | 5 | 50 | 50 | 0.50 |
| Std 4 | 5 | 100 | 50 | 1.00 |
| Std 5 | 2.5 | 125 | 25 | 2.50 |
| Std 6 | 2.5 | 250 | 25 | 5.00 |

The following LC-MS analysis was performed: Make 6 injections of the "Std4" to evaluate system suitability. The RSD % of the peak areas for the working standards and the internal standards must be <5% and RSD (%) of their peak area ratios must be <7% to pass system suitability. Inject working standards 1-6 to create a calibration curve. The square of the correlation coefficient ($r^2$) must be >0.99. Inject test samples followed by a bracketing standard (Std4).

The peak area ratio of the bracketing standard must be within ±10% of the averaged peak area ratio from the system suitability injections.

A calibration curve was constructed by plotting the peak area ratio (reference std/internal std) value that corresponds to the concentration of each working standard solution. The concentration of cholesterol in sample is calculated by solving a quadratic equation. Typical equipment and their settings for the LC-MS analysis are listed below and shown in Tables C and D. The values for the instrument tune parameters may change each time the mass spectrometer is tuned.

Turbovap Conditions:
Temperature: 45° C.
Time: 30 minutes or more to dryness
Gas: nitrogen @ 5 psi
HPLC Conditions:
HPLC: Thermo Accela HPLC Instrument or equivalent
HPLC Column: Agilent Zorbax NH2 (4.6 mm×150 mm; 5 μm particle size)
Mobile Phase: 70% heptane and 30% isopropanol
Column Temperature: 30° C.
Injection Volume: 25 μL
Flow Rate: 1000 μL/min

TABLE C

Mass Spectrometry Conditions
Thermo Finnigan TSQ Quantum Ultra

| MS Settings | Value |
| --- | --- |
| Ionization | APCI |
| Polarity | Positive |
| Scan type | SIM |
| APCI probe position | D |
| Mass (m/z) of Reference Standards | 369.2 |
| Mass (m/z) of Internal Standards | 375.3 |
| Mass width (m/z) | 1.0 |
| Scan time (s) | 0.10 |
| Data type | centroid |
| Peak Width Q3 (FWHM) | 0.40 |
| Skimmer Offset (V) | 10 |

TABLE D

Tune Parameters

| Instrument Tune Parameters | Value |
| --- | --- |
| Discharge Current (arbitrary units): | 20 |
| Capillary temperature (° C.): | 240 |
| Vaporizer Temperature (° C.): | 500 |
| Tube lens offset (V): | 68 |
| Sheath gas pressure (arbitrary units): | 20 |
| Auxiliary gas flow (arbitrary units): | 15 |

The amount of lysozyme uptake by a contact lens was measured by a HPLC-UV method. Lysozyme uptake was determined as the difference of lysozyme content in phosphate-buffered saline solution (PBS) before contact lenses are immersed and the concentration in the test solution after 72 hours of lens immersion at 37° C.

A lysozyme soak solution was prepared by placing 0.215±0.005 grams of lysozyme (purity=93%) into a 100 mL volumetric flask followed by adding 50 mL of PBS to dissolve the lysozyme by swirling followed by dilution to volume with PBS. The resulting lysozyme soak solution was filtered/sterilized using a Millipore Stericup filtration device. The concentration of the lysozyme soak solution is approximately 2000 μg/mL. The mass of lysozyme may be adjusted to account for lot-to-lot purity variability so that a 2000 μg/mL concentration can be achieved.

Three contact lenses were removed from their packages and blotted with lint-free paper towel to remove excess packing solution. The lenses were placed into three separate 8 mL glass vials (one lens per vial). 1.5 mL of the lysozyme soak solution was added to each vial. The vials were capped and inspected to ensure each lens was completely immersed in the soak solution. As control samples, 1.5 mL of lysozyme soak solution were added into three separate 8 mL glass vials. The samples were then incubated on a New Brunswick Scientific incubator-shaker for 72 hours at 37° C. and 100 rpm.

A diluent was prepared by mixing 900 mL water, 100 mL acetonitrile and 1 mL trifluoroacetic acid into a 1 L glass bottle.

A lysozyme stock solution was prepared by placing 0.240±0.010 grams of lysozyme (purity=93%) into a 100 mL volumetric flask followed by dilution to volume with diluent. The concentration of the lysozyme stock solution is approximately 2200 μg/mL.

As shown in Table E, a series of working standard solutions was prepared by mixing the appropriate amounts of lysozyme stock solution with diluent using 5 mL volumetric flasks.

TABLE E

Working Standards

| Working Standard Name | Volume of Stock Solution (mL) | Final Volume (mL) | Approximate Lysozyme Concentration (μg/mL) |
| --- | --- | --- | --- |
| Std 1 | 1.135 | 5 | 500 |
| Std 2 | 1.815 | 5 | 800 |
| Std 3 | 2.725 | 5 | 1200 |
| Std 4 | 3.635 | 5 | 1600 |
| Std 5 | 4.540 | 5 | 2000 |
| Std 6 (stock) | — | — | 2200 |

A 10% (v/v) solution was prepared by adding 1 mL of trifluoroacetic acid into a 10 mL glass volumetric flask followed by dilution with HPLC water. Samples for HPLC-UV analysis were prepared as follows: (1) by placing 1000 μL of test sample and 10 μL of the 10% TFA solution into an autosampler vial or (2) by placing 1000 μL of reference standard and 10 μL of reference standard diluent into an autosampler vial.

The analysis involved the following steps: Perform 6 injections of the "Std4" to evaluate system suitability. The RSD % of the peak areas and retention times must be <0.5% to pass system suitability. Inject working standards 1-6 to create a calibration curve. The square of the correlation coefficient ($r^2$) must be >0.99. Inject test samples followed by a bracketing standard (Std4). The peak area of the bracketing standard must be ±1% of the averaged peak areas from the system suitability injections.

A calibration curve was constructed by plotting the peak area value that corresponds to the concentration of each lysozyme working standard solution. The concentration of lysozyme in the test samples was calculated by solving a linear equation. Typical equipment and their settings are listed below or shown in Table F.

Instrument: Agilent 1200 HPLC with UV detection (or equivalent HPLC-UV)
Detection: UV @ 280 nm (5 nm bandwidth)

HPLC Column: Phenomenex Luna C5 (50×4.6 mm) or Agilent PLRP-S (50×4.6 mm)
  Mobile Phase A: H2O (0.1% TFA)
  Mobile Phase B: Acetonitrile (0.1% TFA)
  Column Temperature: 40° C.
  Injection Volume: 10 μL Table F

| | HPLC Run Conditions | | |
|---|---|---|---|
| Time (minutes) | % A | % B | Flow Rate (mL/min) |
| 0.0 | 95 | 5 | 1.2 |
| 4.0 | 5 | 95 | 1.2 |
| 4.1 | 95 | 5 | 1.2 |
| 6.5 | 95 | 5 | 1.2 |

Haze may be measured by placing a hydrated test lens in borate buffered saline in a clear glass cell at ambient temperature above a flat black background, illuminating from below with a fiber optic lamp (Dolan-Jenner PL-900 fiber optic light with 0.5" diameter light guide) at an angle 66° normal to the lens cell, and capturing an image of the lens from above, normal to the lens cell with a video camera (DVC 1300 C:19130 RGB camera or equivalent equipped with a suitable zoom camera lens) placed 14 mm above the lens holder. The background scatter is subtracted from the scatter of the test lens by subtracting an image of a blank cell with borate buffered saline (baseline) using EPIX XCAP V 3.8 software. The value for high end scatter (frosted glass) is obtained by adjusting the light intensity to be between 900 to 910 mean grayscale. The value of the background scatter (BS) is measured using a saline filled glass cell. The subtracted scattered light image is quantitatively analyzed, by integrating over the central 10 mm of the lens, and then comparing to a frosted glass standard. The light intensity/power setting was adjusted to achieve a mean grayscale value in the range of 900-910 for the frosted glass standard; at this setting, the baseline mean grayscale value was in the range of 50-70. The mean grayscale values of the baseline and frosted glass standard are recorded and used to create a scale from zero to 100, respectively. In the grayscale analysis, the mean and standard deviations of the baseline, frosted glass, and every test lens was recorded. For each lens, a scaled value was calculated according to the equation: scaled value equals the mean grayscale value (lens minus baseline) divided by the mean grayscale value (frosted glass minus baseline) times by 100. Three to five test lenses are analyzed, and the results are averaged.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

The following abbreviations will be used throughout the Examples and have the following meanings:
DMA: N, N-dimethylacrylamide (Jarchem)
HEMA: 2-hydroxyethyl methacrylate (Bimax)
mPEG 500: polyethylene glycol methyl ether methacrylate (Aldrich) ($M_n$=500 grams/mole)
PVP: poly(N-vinylpyrrolidone) (ISP Ashland)
TEGDMA: tetraethylene glycol dimethacrylate (Esstech)
Irgacure 819: bis(2,4,6-trimethylbenzoyl)-phenylphosphineoxide (BASF or Ciba Specialty Chemicals)
HO-mPDMS: mono-n-butyl terminated mono-(2-hydroxy-3-methacryloxypropyl)-propyl ether terminated polydimethylsiloxane ($M_n$=400-1500 grams/mole) (Ortec or DSM-Polymer Technology Group)
Norbloc: 2-(2'-hydroxy-5-methacrylyloxyethylphenyl)-2H-benzotriazole (Janssen)
Blue HEMA: 1-amino-4-[3-(4-(2-methacryloyloxy-ethoxy)-6-chlorotriazin-2-ylamino)-4-sulfophenylamino]anthraquinone-2-sulfonic acid, as described in U.S. Pat. No. 5,944,853
D3O: 3,7-dimethyl-3-octanol (Vigon)
DIW: deionized water
IPA: isopropyl alcohol
PG: 1,2-propylene glycol
PS: Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.
BC: base or back curve plastic mold made of PP, TT, Z, or blends thereof
FC: front curve plastic mold made of PP, TT, Z, or blends thereof
PP: polypropylene which is the homopolymer of propylene
TT: Tuftec which is a hydrogenated styrene butadiene block copolymer (Asahi Kasei Chemicals)
Z: Zeonor which is a polycycloolefin thermoplastic polymer (Nippon Zeon Co Ltd)
RMM: reactive monomer mixture
TL03 Lights: Phillips TLK 40 W/03 or equivalents
LED: light emitting diode
WC: water content (weight %)
EC Dk: edge-corrected oxygen gas permeability (barrers)
M: modulus (psi)
TS: tensile strength (psi)
ETB: elongation to break (%)
RI: refractive index
Sessile Drop: advancing contact angle (degrees)

Example 1

A reactive monomer mixture was formed by mixing the reactive components listed in Table 1 and then diluting that mixture with D3O such that the weight ratio of the reactive components to D3O was 75:25 (w/w). This formulation was filtered through a 3 μm filter using a stainless-steel syringe and degassed by applying vacuum (about 40 mm Hg). Contact lenses (spherical, minus one diopter), representing the crosslinked substrate network containing activatable monoacylphosphine oxide end-groups, were fabricated on a pilot plant manufacturing line as described below.

Under a nitrogen gas atmosphere and about 3 percent oxygen gas, about 73 μL of the reactive monomer mixture were dosed into the FC made of a 90:10 (w/w) blend of Z and TT. The BC made of a 90:10 (w/w) blend of Z and PP was then placed onto the FC. Pallets, each containing eight lens mold assemblies, were conveyed through a curing tunnel during which the pallets were irradiated for a total of 13 minutes at 60° C. using 435 nm LED lights having intensity of 3.5 mW/cm$^2$ at the pallet's surface. The light source was located above the pallets. Working under yellow lights, lenses were released from the molds by soaking in 70% (v/v) aqueous IPA for 6 hours at 25° C., exchanging the aqueous IPA solution every 2 hours with fresh solution, then hydrated in DIW for 4 hours at 25° C., exchanging the DIW after 2 hours. The hydrated lenses were stored in DIW in amber jars and protected from white light exposure.

TABLE 1

| Component | Weight % |
|---|---|
| OH-mPDMS, n = 4 | 13 |
| OH-mPDMS, n = 15 | 49 |
| DMA | 21 |
| HEMA | 6 |
| PVP K90 | 7 |
| TEGDMA | 1.64 |
| Norbloc | 2 |
| Irgacure 819 | 0.34 |
| Blue-HEMA | 0.02 |

Example 2

In a separatory funnel, mPEG500 was dissolved in water and extracted three times with cyclohexane to remove inhibitor and then the water removed by rotary evaporation. A 5% (w/v) grafting solution was prepared by dissolving the purified mPEG500 in a 50:50 (v/v) solution of PG and DIW.

In a glove box, under yellow lights and taking precautions to limit exposure to white light, lenses from Example 1 were blotted dry with lint free tissue and suspended in excess grafting solution for at least 24 hours. The jar of the equilibrated lenses was transferred into the glove box containing an apparatus for voxel based lithography as shown in FIG. 1 wherein the oxygen gas concentration was less than 0.5%. The jar was opened and agitated using a shaker table for at least 2 hours to equilibrate with the low oxygen gas atmosphere.

The reservoir of the apparatus was filled with 350 microliters of grafting solution. Then, a lens was placed in the center of the reservoir, FC facing down. The glass optic was positioned on top of the lens thereby holding the lens in place. The lens was exposed to a minus 10 cylinder digital mirror device (DMD) light show, yielding a lens with a grafted cylinder thickness profile as shown in FIG. 2. The DMD light show used a 410 nm LED lamp with an amplifier output of 350 mAmp. The DMD light show lasted 82 seconds. The grafted lens was placed into a vial containing DIW. After at least 30 minutes, the DIW was decanted and replaced with fresh DIW. After at least 30 minutes, the DIW was decanted and replaced with PS. Finally, the lenses were sterilized by autoclaving at 121° C. for about 30 minutes. As controls, some un-grafted lenses that were suspended in the grafting solution were also treated with DIW and PS and then sterilized.

Pictures of the sterile grafted and un-grafted lenses are shown in FIG. 3 which clearly show the grafted cylinder from by locally grafting the mPEG500 onto the silicone hydrogel crosslinked substrate network.

We claim:

1. An ophthalmic device formed by a process comprising:
    (a) providing a first reactive composition containing: (i) a bisacylphosphine oxide polymerization initiator; (ii) one or more ethylenically unsaturated compounds; and (iii) a crosslinker;
    (b) subjecting the first reactive composition to a first activation step such that the first reactive composition polymerizes therein to form a crosslinked substrate network containing a covalently bound activatable monoacylphosphine oxide free radical initiator;
    (c) contacting the crosslinked substrate network with a grafting composition containing one or more ethylenically unsaturated compounds, wherein the contacting is conducted under conditions such that the grafting composition penetrates into the crosslinked substrate network; and
    (d) activating the covalently bound monoacylphosphine oxide free radical initiator at one or more selective regions of the crosslinked substrate network such that the grafting composition polymerizes with the crosslinked substrate network at the selective regions.

2. The ophthalmic device of claim 1 wherein the grafting composition of step (c) contains a crosslinker.

3. The ophthalmic device of claim 1 wherein the grafting composition of step (c) is free of a crosslinker.

4. The ophthalmic device of claim 1 wherein the one or more ethylenically unsaturated compounds of step (a) comprise one or more polymerizable groups independently selected from: (meth)acrylate, (meth)acrylamide, styryl, vinyl, N-vinyl lactam, N-vinylamide, O-vinylether, O-vinylcarbonate, O-vinylcarbamate, $C_{2-12}$alkenyl, $C_{2-12}$alkenylphenyl, $C_{2-12}$alkenylnaphthyl, and $C_{2-6}$alkenylphenyl-$C_{1-6}$alkyl.

5. The ophthalmic device of claim 1 wherein the one or more ethylenically unsaturated compounds of step (c) comprise one or more polymerizable groups independently selected from: (meth)acrylate, (meth)acrylamide, styryl, vinyl, N-vinyl lactam, N-vinylamide, O-vinylether, O-vinylcarbonate, O-vinylcarbamate, $C_{2-12}$alkenyl, $C_{2-12}$alkenylphenyl, $C_{2-12}$alkenylnaphthyl, and $C_{2-6}$alkenylphenyl-$C_{1-6}$alkyl.

6. The ophthalmic device of claim 1 that is in the form of a hydrogel and wherein the first reactive composition contains one or more silicone-containing components and the grafting composition contains one or more hydrophilic reactive components.

7. The ophthalmic device of claim 1 that is in the form of a hydrogel and wherein the first reactive composition contains one or more hydrophilic reactive components and the grafting composition contains one or more silicone-containing components.

8. The ophthalmic device of claim 1 wherein the first reactive composition, the grafting composition, or both the first reactive composition and the grafting composition contain one or more additives selected from UV absorbers, photochromic compounds, pharmaceutical compounds, nutraceutical compounds, antimicrobial compounds, reactive tints, pigments, copolymerizable dyes, non-polymerizable dyes, release agents, wetting agents, and release agents.

9. The ophthalmic device of claim 1 selected from the group consisting of a contact lens, an intraocular lens, a punctal plug and an ocular insert.

10. The ophthalmic device of claim 1 wherein the process further comprises: following step (d), contacting the crosslinked substrate network with a second grafting composition containing one or more ethylenically unsaturated compounds and activating residual covalently bound activatable free radical initiator in the crosslinked substrate network such that the second grafting composition polymerizes therein with the crosslinked substrate network.

11. A process for making an ophthalmic device, the process comprising:
    (a) providing a first reactive composition containing: (i) a bisacylphosphine oxide polymerization initiator (ii) one or more ethylenically unsaturated compounds; and (iii) a crosslinker;
    (b) subjecting the first reactive composition to a first activation step such that the first reactive composition polymerizes therein to form a crosslinked substrate network containing a covalently bound activatable monoacylphosphine oxide free radical initiator;

(c) contacting the crosslinked substrate network with a grafting composition containing one or more ethylenically unsaturated compounds, wherein the contacting is conducted under conditions such that the grafting composition penetrates into the crosslinked substrate network; and (d) activating the covalently bound activatable monoacylphosphine oxide free radical initiator of the crosslinked substrate network such that the grafting composition polymerizes therein with the crosslinked substrate network.

12. The process of claim 11 wherein the grafting composition of step (c) contains a crosslinker.

13. The process of claim 11 wherein the grafting composition of step (c) is free of a crosslinker.

14. The process of claim 11 wherein the one or more ethylenically unsaturated compounds of step (a) comprise one or more polymerizable groups independently selected from: (meth)acrylate, (meth)acrylamide, styryl, vinyl, N-vinyl lactam, N-vinylamide, O-vinylether, O-vinylcarbonate, O-vinylcarbamate, $C_{2-12}$alkenyl, $C_{2-12}$alkenylphenyl, $C_{2-12}$alkenylnaphthyl, and $C_{2-6}$alkenylphenyl-$C_{1-6}$alkyl.

15. The process of claim 11 wherein the one or more ethylenically unsaturated compounds of step (c) comprise one or more polymerizable groups independently selected from: (meth)acrylate, (meth)acrylamide, styryl, vinyl, N-vinyl lactam, N-vinylamide, O-vinylether, O-vinylcarbonate, O-vinylcarbamate, $C_{2-12}$alkenyl, $C_{2-12}$alkenylphenyl, $C_{2-12}$alkenylnaphthyl, and $C_{2-6}$alkenylphenyl-$C_{1-6}$alkyl.

16. The process of claim 11 that is in the form of a hydrogel and wherein the first reactive composition contains one or more silicone-containing components and the grafting composition contains one or more hydrophilic reactive components.

17. The process of claim 11 that is in the form of a hydrogel and wherein the first reactive composition contains one or more hydrophilic reactive components and the grafting composition contains one or more silicone-containing components.

18. The process of claim 11 wherein the first reactive composition, the grafting composition, or both the first reactive composition and the grafting composition contain one or more additives selected from UV absorbers, photochromic compounds, pharmaceutical compounds, nutraceutical compounds, antimicrobial compounds, reactive tints, pigments, copolymerizable dyes, non-polymerizable dyes, release agents, wetting agents, and release agents.

* * * * *